(12) United States Patent  
Mu

(10) Patent No.: US 12,047,881 B2
(45) Date of Patent: Jul. 23, 2024

(54) METHOD AND DEVICE FOR FEEDING BACK HARQ, AND READABLE STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 326 days.

(21) Appl. No.: 17/617,818

(22) PCT Filed: Jun. 10, 2019

(86) PCT No.: PCT/CN2019/090588
§ 371 (c)(1),
(2) Date: Dec. 9, 2021

(87) PCT Pub. No.: WO2020/248102
PCT Pub. Date: Dec. 17, 2020

(65) Prior Publication Data
US 2022/0256463 A1 Aug. 11, 2022

(51) Int. Cl.
*H04W 52/02* (2009.01)
*H04L 1/1812* (2023.01)
*H04W 72/1263* (2023.01)

(52) U.S. Cl.
CPC ....... *H04W 52/0235* (2013.01); *H04L 1/1812* (2013.01); *H04W 52/0219* (2013.01); *H04W 72/1263* (2013.01)

(58) Field of Classification Search
None
See application file for complete search history.

(56) References Cited

U.S. PATENT DOCUMENTS 11,838,132 B2 * 12/2023 Yeo ................ H04W 28/04
2016/0014742 A1 * 1/2016 Papasakellariou .. H04W 52/325
370/294

(Continued)

FOREIGN PATENT DOCUMENTS

CN 1071133725 A 8/2017
CN 108322414 A 7/2018

(Continued)

OTHER PUBLICATIONS

PCT/CN2019/090588 English translation of the International Search Report dated Mar. 13, 2020, 2 pages.

*Primary Examiner* — Kodzovi Acolatse
(74) *Attorney, Agent, or Firm* — Cozen O'Connor

(57) ABSTRACT

Disclosed is an HARQ feedback method, belonging to the technical field of wireless communications. The method is implemented by a base station. The method comprises: sending power-saving signals to at least two terminals, wherein the power-saving signals are used for indicating that the at least two terminals execute corresponding actions related to power saving; and receiving HARQ feedback respectively sent, with regard to the power-saving signals, by the at least two terminals, wherein HARQ feedback resources used when the at least two terminals respectively send the HARQ feedback with regard to the power-saving signals do not overlap. According to the present disclosure, the base station sends the power-saving signals to the at least two terminals and receives the HARQ feedback returned, with regard to the power-saving signals, by the at least two terminals by means of using different HARQ feedback resources, thereby reducing collisions when the at least two terminals use the same HARQ feedback resource and improving the feedback efficiency of the terminals with regard to the power-saving signals.

18 Claims, 8 Drawing Sheets

(56) References Cited

U.S. PATENT DOCUMENTS

| | | | | |
|---|---|---|---|---|
| 2016/0165591 | A1* | 6/2016 | Li | H04J 3/12 |
| | | | | 370/280 |
| 2018/0254872 | A1* | 9/2018 | Seo | H04L 5/0055 |
| 2018/0279291 | A1* | 9/2018 | Tiirola | H04L 25/0224 |
| 2019/0045500 | A1* | 2/2019 | Harrison | H04L 5/0051 |
| 2019/0116006 | A1* | 4/2019 | Lunttila | H04W 72/21 |
| 2020/0205150 | A1* | 6/2020 | Cheng | H04W 72/21 |
| 2020/0213063 | A1* | 7/2020 | Lin | H04B 7/0626 |
| 2020/0229098 | A1* | 7/2020 | Cheng | H04W 52/0248 |
| 2020/0235848 | A1* | 7/2020 | Nguyen | H04W 28/26 |
| 2021/0243763 | A1* | 8/2021 | Zhou | H04L 1/1671 |
| 2021/0314097 | A1* | 10/2021 | Osawa | H04L 1/1864 |
| 2021/0321446 | A1* | 10/2021 | Lee | H04W 72/535 |
| 2021/0409182 | A1* | 12/2021 | Lee | H04L 1/1864 |
| 2022/0247521 | A1* | 8/2022 | Mu | H04W 52/0235 |

FOREIGN PATENT DOCUMENTS

| | | | | |
|---|---|---|---|---|
| WO | WO-2009030168 A1 | * | 3/2009 | H04L 1/1607 |
| WO | WO-2020198356 A1 | * | 10/2020 | H04L 1/1671 |

* cited by examiner

US 12,047,881 B2

METHOD AND DEVICE FOR FEEDING BACK HARQ, AND READABLE STORAGE MEDIUM

CROSS-REFERENCE TO RELATED APPLICATION

This application is a national phase of International Application No. PCT/CN2019/090588, filed on Jun. 10, 2019, the entire content of which is incorporated herein by reference.

TECHNICAL FIELD

The disclosure relates to the field of wireless communication technologies, and more particularly, to a method and an apparatus for feeding back a hybrid automatic repeat request (HARQ) and a readable storage medium.

BACKGROUND

User requirements for wireless communication have grown more and more diverse as the field of wireless communication technologies continues to develop, which promotes continuous evolution of wireless communication technologies to the fifth generation mobile communication technology (5G).

In related arts, a terminal may support various services under the support of the 5G New Radio (NR), for example, multimedia service, cloud service, interaction service. To reduce power consumption of the terminal, the terminal, before performing service data, may determine whether to monitor scheduling data in a physical downlink control channel (PDCCH) based on a power saving signal that is configured by a base station, to save the power of the terminal.

SUMMARY

According to a first aspect of embodiments of the disclosure, a method for feeding back a HARQ is provided. The method is performed by a base station. The method includes the following.

A power saving signal is transmitted to at least two terminals, in which the power saving signal is configured to instruct the at least two terminals to perform an action related to power saving.

HARQs that are respectively transmitted by the at least two terminals for the power saving signal, are received.

HARQ resources used by the at least two terminals for respectively transmitting the HARQs for the power saving signal do not overlap.

According to a second aspect of embodiments of the disclosure, a method for feeding back an HARQ is provided. The method is performed by a target terminal. The method includes the following.

A power saving signal is received; in which the power saving signal is configured to instruct the target terminal to perform an action related to power saving.

The HARQ for the power saving signal is transmitted to a base station.

A HARQ resource used by the target terminal for transmitting the HARQ for the power saving signal and a HARQ resource used by a terminal other than the target terminal for transmitting the HARQ for the power saving signal do not overlap; wherein the target terminal and the terminal other than the target terminal are from at least two terminals indicated by the power saving signal.

According to a third aspect of embodiments of the disclosure, a device for feeding back an HARQ is provided. The device is applicable to a base station. The device includes: a processor; and a memory configured to store instructions executable by the processor. The processor is configured to: transmit a power saving signal to at least two terminals, the power saving signal being configured to instruct the at least two terminals to perform an action related to power saving; and receive HARQs that are respectively transmitted by the at least two terminals for the power saving signal; in which HARQ resources used by the at least two terminals for respectively transmitting the HARQs for the power saving signal do not overlap.

According to a fourth aspect of embodiments of the disclosure, a device for feeding back an HARQ is provided. The device is applicable to a target terminal. The device includes: a processor; and a memory configured to store instructions executable by the processor. The processor is configured to: receive a power saving signal, the power saving signal being configured to instruct the target terminal to perform an action related to power saving; and transmit the HARQ for the power saving signal to a base station; in which a HARQ resource used by the target terminal for transmitting the HARQ for the power saving signal and a HARQ resource used by a terminal other than the target terminal for transmitting the HARQ for the power saving signal do not overlap; wherein the target terminal and the terminal other than the target terminal are from at least two terminals indicated by the power saving signal.

According to a fifth aspect of embodiments of the disclosure, a computer-readable storage medium is provided. The computer-readable storage medium includes executable instructions. The instructions are called by a processor in a base station to perform the method for feeding back the HARQ in the first aspect or any implementation of the first aspect.

According to a sixth aspect of embodiments of the disclosure, a computer-readable storage medium is provided. The computer-readable storage medium includes executable instructions. The instructions are called by a processor in a terminal to perform the method for feeding back the HARQ in the second aspect or any implementation of the second aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

It should be understood that, "several" mentioned in the disclosure refers to one or more and "a plurality of" refers to two or more than two. "And/or" describes association relationships of associated objects and represents that there may be three relationships. For example, A and/or B, may represent that: A exists alone, both A and B exist, and B exists alone. The character "/" generally represents an "or" relationship of the associated objects. For convenience of understanding, some application scenes in the disclosure are briefly introduced below.

Figure 1:
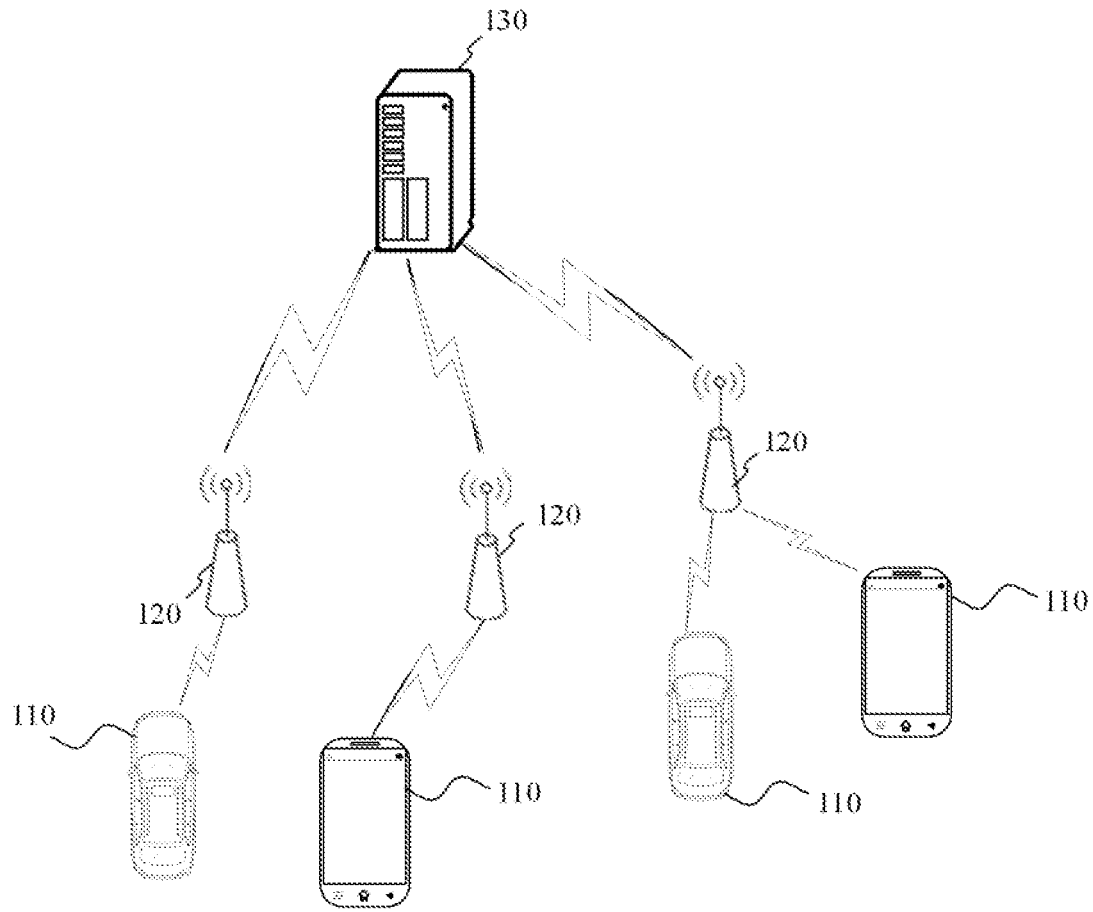
FIG. 1 is a schematic diagram of a structure of a wireless communication system, according to embodiments of the disclosure.

FIG. 1 is a schematic diagram illustrating a structure of a wireless communication system, according to embodiments of the disclosure. As illustrated in FIG. 1, the wireless communication system is a communication system based on a cellular mobile communication technology. The wireless communication system may include several terminals 110 and several base stations 120.

The terminal 110 may refer to a device that provides voice and/or data connectivity to a user. The terminal 110 may communicate with one or more core networks via a radio access network (RAN). The terminal 110 may be an Internet of Things (IoT) terminal such as a sensor device, a mobile phone (or a cellular phone) and a computer with an IoT terminal such as a fixed, portable, pocket-sized, handheld, built-in computer or vehicle-mounted device, for example, station (STA), subscriber unit, subscriber station, mobile station, mobile, remote station, access point, remote terminal, access terminal, user terminal, user agent, user device, or user equipment (UE). Or, the terminal 110 may be a device of an unmanned aircraft, an in-vehicle device, etc.

The base station 120 may be a network side device in the wireless communication system. The wireless communication system may be the 4$^{th}$ generation mobile communication (4G) system, also known as the long term evolution (LTE) system. The wireless communication system may also be the 5$^{th}$ generation mobile communication (5G) system, also known as the new radio (NR) system. Alternatively, the wireless communication system may also be a next-generation system of the 5G system.

The base station 120 may be an evolved base station (eNB) employed in the 4G system. Alternatively, the base station 120 may also be a base station (gNB) employing a centralized distributed architecture in the 5G system. When the base station 120 employs the centralized distributed architecture, it usually includes a central unit (CU) and at least two distributed units (DUs). The CU is provided with a packet data convergence protocol (PDCP) layer, a radio link control (RLC) layer and a protocol stack having a media access control (MAC) layer. The DU is provided with a protocol stack having a physical (PHY) layer. The embodiments of the disclosure may not limit the specific implementation manner of the base station 120.

A wireless link may be established between the base station 120 and the terminal 110 through a wireless air interface. In different embodiments, the wireless air interface is a wireless air interface based on the 4G standard. Alternatively, the wireless air interface is a wireless air interface based on the 5G standard, for example, the wireless air interface is a NR. The wireless air interface may also be a wireless air interface based on a standard of next generation mobile communication network technology based on the 5G standard.

In at least one embodiment, the wireless communication system may further include a network management device 130.

Several base stations 120 are coupled to the network management device 130 respectively. The network management device 130 may be a core network device in the wireless communication system. For example, the network management device 130 may be a mobility management entity (MME) in an evolved packet core (EPC). Alternatively, the network management device may be other core network device, such as a serving gateway (SGW), a public data network gateway (PGW), a policy and charging rules function (PCRF), unit or a home subscriber server (HSS). The implementation form of the network management device 130 is not limited in the embodiments of the disclosure.

In a possible implementation, in the wireless communication system, the terminal 110 needs to monitor a PDCCH when scheduling data is transmitted in the PDCCH, thereby receiving the scheduling data transmitted in the PDCCH. For example, when the terminal monitors the PDCCH, if first scheduling data issued by the base station is transmitted in the PDCCH, the terminal may receive the first scheduling data issued by the base station. In the NR system, before the scheduling data is transmitted in the PDCCH, the terminal 110 monitors the PDCCH within the certain specific time, without monitoring in real time. Optionally, in embodiments of the disclosure, the certain specific time is named as "active time".

In a possible implementation, the active time may be on duration time in discontinuous reception (DRX) or monitoring occasions configured by the base station in the PDCCH. That is, when the active time arrives, the terminal may start to monitor scheduling data transmitted in the PDCCH. In this case, when there is no scheduling data transmitted in the arriving active time for the terminal, if the terminal starts to monitor scheduling data transmitted in the PDCCH, the terminal may extra consume the power of the terminal for monitoring the PDCCH in the active time, causing unnecessary power losses.

To avoid the situation, the power saving signal is introduced before the active time arrives in a solution provided in the disclosure, to further save the power consumption of the terminal, thereby prompting that the terminal starts to monitor scheduling data transmitted in the PDCCH in the active time or prompting that the terminal does not monitor scheduling data transmitted in the PDCCH in the active time. That is, the power saving signal may indicate whether the terminal starts to monitor scheduling data transmitted in the PDCCH in the active time. Optionally, when the power saving signal received by the terminal indicates that the terminal does not start to monitor scheduling data transmitted in the PDCCH in the current active time, the terminal may continue to wait for a next power saving signal, thereby avoiding the power waste caused when the terminal continues to monitor the PDCCH in the time period of not transmitting scheduling data.

Optionally, when the power saving signal received by the terminal indicates that the terminal monitors scheduling data transmitted in the PDCCH in the current active time and the terminal starts to monitor scheduling data transmitted in the PDCCH, the base station may further issue a related parameter configuration for the terminal. The related parameter configuration may be configured to indicate a related parameter employed preferably by the terminal when monitoring the PDCCH in the current active time. The terminal may monitor scheduling data transmitted in the PDCCH by employing the related parameter. Optionally, the related parameter may include a frequency when the terminal performs PDCCH monitoring, a number of receiving or transmitting antennas used when the terminal performs PDCCH monitoring, a bandwidth required when the terminal performs PDCCH monitoring, etc. For example, when the services that need to be performed by the terminal in the active time are relatively dense and a plurality of services need to be performed at the same time, the amount of scheduling data required to be transmitted may be correspondingly larger and the related parameter configuration issued by the base station for the terminal may indicate that the terminal may perform monitoring at a relatively dense frequency, scheduling data may be transmitted with a relatively larger bandwidth, more receiving or transmitting antennas may be enabled, and the like. Similarly, when the services that need to be performed in the active time are relatively sparse, that is, fewer services need to be performed in the active time, the amount of scheduling data required to be transmitted may be correspondingly smaller and the related parameter configuration issued by the base station for the terminal may indicate that the terminal may perform monitoring at a relatively sparse frequency, scheduling data may be transmitted with a smaller bandwidth, fewer receiving or transmitting antennas may be enabled, and the like.

The power saving signal is also carried in the PDCCH. When the base station configures one power saving signal for each terminal, a large PDCCH overhead may be caused. Therefore, a group power saving signal is provided in the disclosure, that is, the power saving signal carried in the PDCCH is for a plurality of terminals and the power saving signal may indicate whether the plurality of terminals start to monitor scheduling data transmitted in the PDCCH in the active time. Table 1 illustrates a schematic table illustrating a group power saving signal transmitted by a base station according to some embodiments of the disclosure.

TABLE 1

| ... | power saving information of terminal 1 | power saving information of terminal 2 | power saving information of terminal 3 | cyclic redundancy check code |
|---|---|---|---|---|

As illustrated in Table 1, the group power saving signal may include power saving information of a plurality of terminals (Table 1 illustrates 3 terminals). Each terminal may obtain its own power saving information included in the group power saving signal and determine, based on its own power saving information, whether to start to monitor scheduling data transmitted in the PDCCH in the next arriving active time or whether to adjust the related parameter configuration of data transmission.

When the base station transmits the group power saving signal, an error may occur or the terminal fails to receive the group power saving signal transmitted by the base station due to other reasons. When the base station may not clearly know the reception condition of the group power saving signal transmitted to the terminal, it may cause subsequent transmission data between the base station and the terminal inconsistent, thereby causing communication failure. Therefore, the terminal needs to feed back for the group power saving signal transmitted by the base station. Optionally, the feedback performed by the terminal for the group power saving signal transmitted by the base station may be a feedback based on an HARQ.

In related arts, for the NR system, when the feedback solution based on the HARQ is performed by the terminal, the terminal may calculate a HARQ resource based on the end time of the received data and perform a feedback on the calculated resource. For example, when the terminal may perform the feedback based on HARQ on the received data in the PDCCH indicating a semi-persistent scheduling (SPS), the terminal may obtain an end time when receiving the data and a time offset M on the end time, thereby obtaining a feedback time for transmitting the HARQ. The time offset M may be indicated in a downlink control signaling (DCI) issued by the base station. Optionally, the base station may configure a set of time intervals for the DCI by a higher layer signaling and the DCI may indicate the terminal to use one value in the set of time intervals as the time offset M to calculate the feedback time of transmitting the HARQ at this time.

Optionally, when the terminal transmits the HARQ on the calculated HARQ time, it further needs to determine which PUCCH resource within the time to transmit the HARQ, that is, the terminal further needs to determine the PUCCH resource. In a possible implementation, the manner of determining the PUCCH resource by the terminal may be as follows. A higher layer signaling may configure a PUCCH resource set for the terminal in advance and each PUCCH in the set has a unique corresponding serial number. When the number of PUCCH resources in the PUCCH resource set configured by the higher layer signaling is less than or equal to 8, the serial number of each PUCCH may be directly indicated by a 3-bit information field in the DCI. For example, 001 may indicate the serial number of one PUCCH in the PUCCH resources and the terminal may obtain the corresponding PUCCH resource based on 001 indicated by the information field in the DCI. When the number of PUCCH resources in the PUCCH resource set configured by the higher layer signaling is greater than 8, the terminal may calculate the serial number of the PUCCH resource used through a derivation formula based on the serial number of the minimum control channel element (CCE) in a control field located by the PUCCH resource set and the indication value of the 3-bit information field in the DCI. Optionally, the derivation formula may be as follows:

$$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

where, $r_{PUCCH}$ is the calculated serial number of the PUCCH resource, $R_{PUCCH}$ is the number of PUCCH resources in the PUCCH resource set configured by the higher layer signaling for the terminal, $N_{CCE,p}$ is the total number of CCEs in the control field located by the PDCCH, $n_{CCE,p}$ is the serial number of the minimum CCE in the CCEs in the control field located by the PDCCH, $\Delta_{PRI}$ is an indication value of the 3-bit information field in the DCI, and $R_{PUCCH}$ mod 8 is a remainder corresponding to $R_{PUCCH}$ divided by 8. Optionally, when the terminal may perform the feedback based on the HARQ on data in a physical downlink shared channel (PDSCH) received, reference should be made to the above manner.

Since the power saving signal carried in the PDCCH may be shared by a plurality of terminals at the same time, that is, the base station may adopt a power saving signal sharing manner to save the PDCCH overhead of the base station, the plurality of terminals receive the power saving signal transmitted by the base station and correspondingly the plurality of terminals may perform the feedback based on the HARQ on the same PDCCH. At this time, when the HARQ solution in the NR system is still adopted, for the same PDCCH, the serial number of the minimum CCE in the CCEs owned by the control field of the same PDCCH is the same. When the indication values of the 3-bit information field indicated in the DCI for the plurality of terminals are also the same at this time, the PUCCH resources calculated based on the derivation formula are also the same, resulting in collisions of the PUCCH when the plurality of terminals perform the feedback based on the HARQ and reducing the transmission efficiency of the HARQ information.

Figure 2:
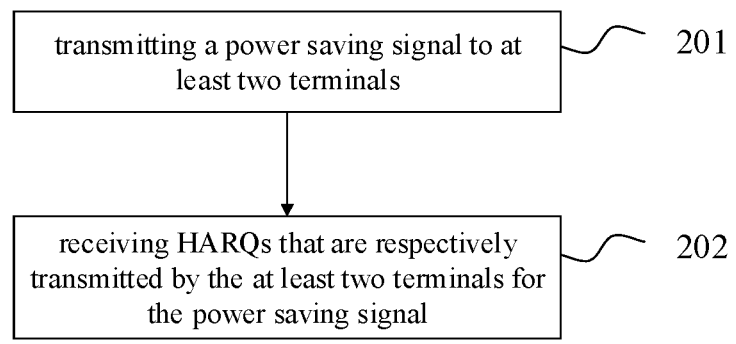
FIG. 2 is a flowchart of a method for feeding back an HARQ, according to embodiments of the disclosure.

In order to reduce collisions of the PUCCH used when the plurality of terminals perform the feedback based on the HARQ for the same power saving signal, the disclosure provides a method for feeding back an HARQ. FIG. 2 is a flowchart illustrating a method for feeding back an HARQ, according to embodiments of the disclosure. The method may be applicable to the wireless communication system as illustrated in FIG. 1 and performed by the base station in the system. As illustrated in FIG. 2, the method may include the following.

At 201, a power saving signal is transmitted to at least two terminals.

The power saving signal is configured to instruct the at least two terminals to perform an action related to power saving.

At 202, HARQs that are respectively transmitted by the at least two terminals for the power saving signal, are received.

The HARQ resources used by the at least two terminals for respectively transmitting the HARQs for the power saving signal do not overlap.

Optionally, transmitting the power saving signal to the at least two terminals, includes the following.

The power saving signal is transmitted to the at least two terminals in response to that PUCCH resource sets of the at least two terminals do not overlap.

The PUCCH resource set is a set of available PUCCH resources configured by a higher layer signaling to the corresponding terminal.

Optionally, before transmitting the power saving signal to the at least two terminals, the method further includes the following.

PUCCH offset information is configured for each of terminals, in which the terminals include the at least two terminals.

Optionally, transmitting the power saving signal to the at least two terminals, includes the following.

The power saving signal including a PUCCH parameter of each of the at least two terminals, is transmitted to the at least two terminals; the PUCCH parameter includes at least one of: a time parameter k and a PUCCH resource indicator $\Delta_{PRI}$; the time parameter k is configured to indicate a time point of transmitting the HARQ and the PUCCH resource indicator $\Delta_{PRI}$ is configured to indicate a PUCCH resource configured for transmitting the HARQ.

Optionally, before transmitting the power saving signal to the at least two terminals, the method further includes the following.

A PUCCH resource for transmitting the HARQ for the power saving signal, is configured for each of terminals, in which the terminals include the at least two terminals.

Optionally, before transmitting the power saving signal to the at least two terminals, the method further includes the following.

A common PUCCH resource set is configured for each of terminals, in which the terminals include the at least two terminals and a number of PUCCH resources in the common PUCCH resource set is not less than a number of the at least two terminals.

Optionally, the action related to power saving includes the following.

Detecting and receiving a PDCCH for data scheduling.

Or, skipping detection and reception of a PDCCH for data scheduling.

Or, adjusting a related parameter of communication, in which the related parameter includes at least one of: a bandwidth value used by the terminal, a number of antennas used by the terminal, and a number of candidate positions of the PDCCH.

In summary, the base station transmits the power saving signal to the at least two terminals, in which the power saving signal is configured to instruct the at least two terminals to perform the action related to power saving; and receives the HARQs that are respectively transmitted by the at least two terminals for the power saving signal. The HARQ resources used by the at least two terminals for respectively transmitting the HARQs for the power saving signal do not overlap. In the disclosure, the base station transmits the power saving signal to the at least two terminals and receives the HARQs for the power saving signal, returned by the at least two terminals with different HARQ resources, thereby reducing collisions where the at least two terminals use the same HARQ resource and improving the feedback efficiency of the terminal for the power saving signal.

Figure 3:
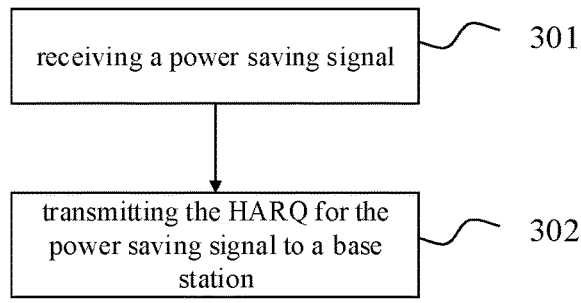
FIG. 3 is a flowchart of a method for feeding back an HARQ, according to embodiments of the disclosure.

FIG. 3 is a flowchart illustrating a method for feeding back an HARQ, according to embodiments of the disclosure. As illustrated in FIG. 3, the method for feeding back the HARQ may be applicable to the wireless communication system as illustrated in FIG. 1 and performed by a target terminal in the at least two terminals corresponding to the power saving signal transmitted by the base station. The method may include the following.

At 301, a power saving signal is received.

The power saving signal is configured to instruct the target terminal to perform an action related to power saving.

At 302, the HARQ for the power saving signal is transmitted to the base station.

A HARQ resource used by the target terminal for transmitting the HARQ for the power saving signal and a HARQ resource used by a terminal other than the target terminal for transmitting the HARQ for the power saving signal do not overlap; wherein the target terminal and the terminal other than the target terminal are from at least two terminals indicated by the power saving signal.

Optionally, receiving the power saving signal, includes the following.

The power saving signal transmitted by the base station in response to that PUCCH resource sets of the at least two terminals do not overlap, is received.

The PUCCH resource set is a set of available PUCCH resources configured by a higher layer signaling to the corresponding terminal.

Optionally, the HARQ resource used by the target terminal for transmitting the HARQ for the power saving signal is determined based on a PUCCH resource of the target terminal.

The first target PUCCH resource of the target terminal is determined from a PUCCH resource set of the target terminal based on PUCCH offset information of the target terminal.

Optionally, before receiving the power saving signal, the method further includes the following.

The PUCCH offset information configured by the base station for the target terminal, is received.

Optionally, the HARQ resource used by the target terminal for transmitting the HARQ for the power saving signal is determined based on a PUCCH parameter of the target terminal. The PUCCH parameter includes at least one of: a time parameter k and a PUCCH resource indicator $\Delta_{PRI}$; the time parameter k is configured to indicate a time point of transmitting the HARQ and the PUCCH resource indicator $\Delta_{PRI}$ is configured to indicate a PUCCH resource configured for transmitting the HARQ.

Optionally, receiving the power saving signal, includes the following.

The power saving signal including the PUCCH parameter of each of the at least two terminals is received.

Optionally, before receiving the power saving signal, the method further includes the following.

A PUCCH resource that is configured by the base station for the target terminal to transmit the HARQ for the power saving signal is received.

Optionally, the HARQ resource used by the target terminal for transmitting the HARQ for the power saving signal is determined based on a second target PUCCH resource of the target terminal.

The second target PUCCH resource of the target terminal is determined from a common PUCCH resource set based on a position of power saving information of the target terminal in the power saving signal; a number of PUCCH resources in the common PUCCH resource set is not less than a number of the at least two terminals; and the power saving information is saving information of each of the at least two terminals in the power saving signal.

Optionally, before receiving the power saving signal, the method further includes the following.

The common PUCCH resource set configured by the base station is received.

Optionally, the action related to power saving includes the following.

Detecting and receiving a PDCCH for data scheduling.

Or, skipping detection and reception of a PDCCH for data scheduling.

Or, adjusting a related parameter of communication, in which the related parameter includes at least one of: a bandwidth value used by the terminal, a number of antennas used by the terminal, and a number of candidate positions of the PDCCH.

In summary, the base station transmits the power saving signal to the at least two terminals, in which the power saving signal is configured to instruct the at least two terminals to perform the action related to power saving; and receives the HARQs that are respectively transmitted by the at least two terminals for the power saving signal. The HARQ resources used by the at least two terminals for respectively transmitting the HARQs for the power saving signal do not overlap. In the disclosure, the base station transmits the power saving signal to the at least two terminals and receives the HARQs for the power saving signal, returned by the at least two terminals with different HARQ resources, thereby reducing collisions where the at least two terminals use the same HARQ resource and improving the feedback efficiency of the terminal for the power saving signal.

Figure 4:
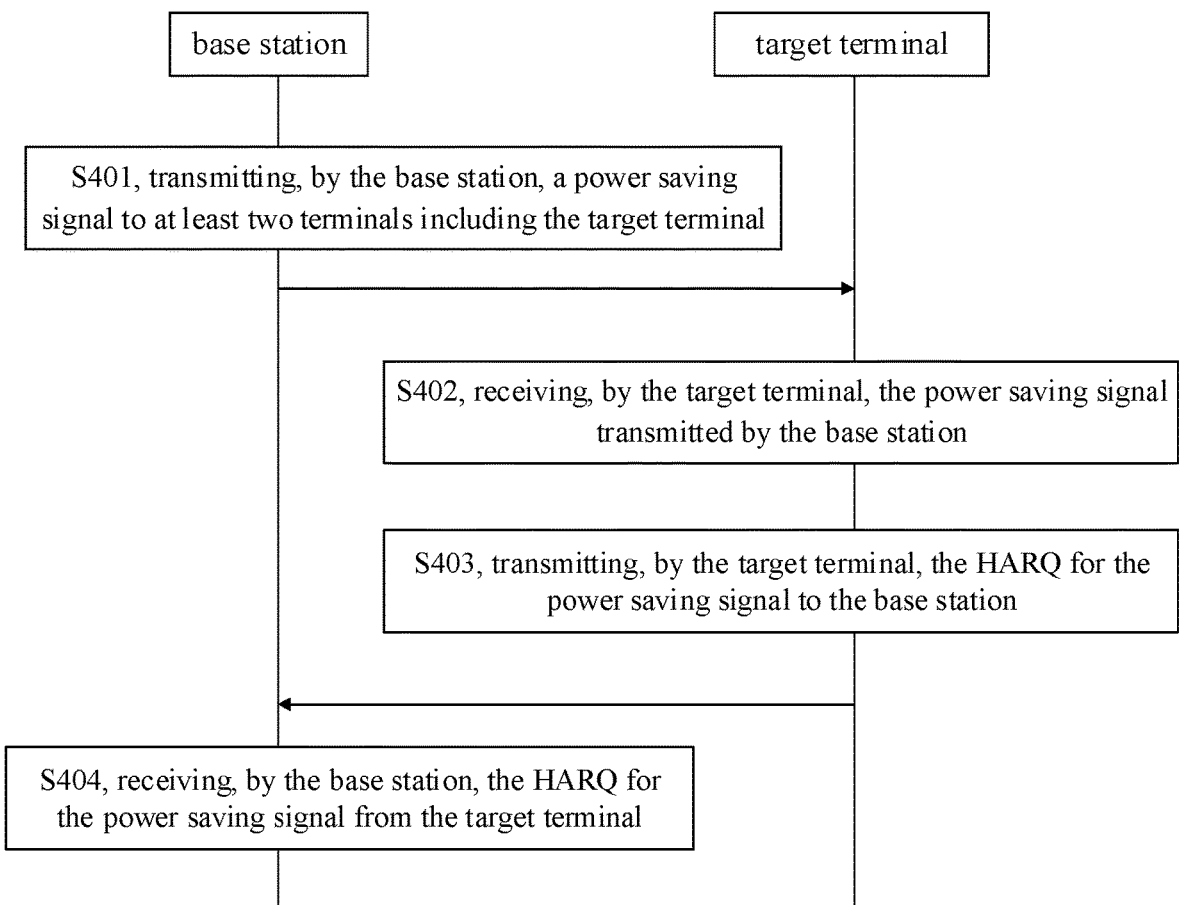
FIG. 4 is a flowchart of a method for feeding back an HARQ, according to embodiments of the disclosure.

FIG. 4 is a flowchart illustrating a method for feeding back an HARQ, according to embodiments of the disclosure. As illustrated in FIG. 4, the method for feeding back the HARQ may be applicable to the wireless communication system as illustrated in FIG. 1 and performed by the base station and the terminal in the system. The method may include the following.

At 401, the base station transmits a power saving signal to at least two terminals including a target terminal.

Optionally, the base station transmits the power saving signal to the target terminal, which may be that the base station transmits the power saving signal to the at least two terminals and the at least two terminals include the target terminal. The power saving signal is configured to instruct the at least two terminals to perform an action related to power saving. The power saving signal may include power saving information respectively corresponding to the at least two terminals.

Optionally, the base station may transmit the power saving signal to the at least two terminals in a multicast form. Optionally, the base station may transmit the power saving signal to the at least two terminals periodically and the period of the power saving signal may be notified by the DCI to the at least two terminals.

Optionally, the power saving signal may include power saving information corresponding to each of the at least two terminals, which refers to Table 1 as mentioned above. The base station may transmit power saving information corresponding to each of the at least two terminals to the at least two terminals in the form of Table 1. Each piece of power saving information in Table 1 may be configured to indicate whether there is scheduling data transmitted in the PDCCH for the corresponding terminal.

Optionally, the base station may determine a PUCCH resource set of each terminal in the power saving signal of the target terminal before transmitting the power saving signal to the target terminal, that is, the base station may determine the PUCCH resource sets correspondingly configured for the at least two terminals before transmitting the power saving signal to the at least two terminals. When the PUCCH resource sets of the at least two terminals do not overlap, the base station may transmit the power saving signal to the at least two terminals. For example, a developer or an operation and maintenance personnel may set a sharing rule in the base station in advance and the base station may determine the PUCCH resource sets configured for the at least two terminals corresponding to the power saving signal that is to be transmitted according to the sharing rule. Optionally, the PUCCH resource set may be a set of available PUCCH resources configured by a higher layer signaling to the corresponding terminal.

In a possible implementation, the PUCCH resource sets of the at least two terminals do not overlap, which refers to that the PUCCH resources corresponding to the same serial number in the PUCCH resource sets of different terminals are different. Tables 2 to 4 illustrate a PUCCH resource set configuration table of three terminals according to embodiments of the disclosure.

TABLE 2

| serial number of PUCCH resource | PUCCH resource |
| --- | --- |
| 1 | PUCCH1 |
| 2 | PUCCH2 |
| 3 | PUCCH3 |
| 4 | PUCCH4 |
| 5 | PUCCH5 |

TABLE 3

| serial number of PUCCH resource | PUCCH resource |
| --- | --- |
| 1 | PUCCH1 |
| 2 | PUCCH2 |
| 3 | PUCCH3 |
| 4 | PUCCH4 |
| 5 | PUCCH5 |

TABLE 4

| serial number of PUCCH resource | PUCCH resource |
| --- | --- |
| 1 | PUCCH2 |
| 2 | PUCCH3 |
| 3 | PUCCH4 |
| 4 | PUCCH5 |
| 5 | PUCCH1 |

It is assumed that Table 2 to Table 4 are PUCCH resource sets of terminal 1, terminal 2 and terminal 3 respectively. As illustrated in Table 2 to Table 4, the PUCCH resource sets of terminal 1, terminal 2 and terminal 3, each may include serial numbers of PUCCH resources and the corresponding PUCCH resources for the corresponding terminal. As illustrated in Table 2 and Table 3, in the PUCCH resource sets of terminal 1 and terminal 2, the PUCCH resources corresponding to the same serial number of PUCCH resource, of terminal 1 and terminal 2, are the same, that is, the PUCCH resource sets of terminal 1 and terminal 2 overlap. As illustrated in Table 2 and Table 4, in the PUCCH resource sets of terminal 1 and terminal 3, the PUCCH resources corresponding to the same serial number of PUCCH resource, of terminal 1 and terminal 3, are different, that is, the PUCCH resource sets of terminal 1 and terminal 3 do not overlap. Similarly, the PUCCH resource sets of terminal 2 and terminal 3 do not overlap.

For example, when the at least two terminals are terminal 1 and terminal 3, the base station may determine that the PUCCH resource sets of terminal 1 and terminal 3 do not overlap according to the sharing rule and transmit the power saving signal including power saving information of terminal 1 and terminal 3 to terminal 1 and terminal 3. Similarly, when the at least two terminals are terminal 2 and terminal 3, the base station may determine that the PUCCH resource sets of terminal 2 and terminal 3 do not overlap according to the sharing rule and transmit the power saving signal including power saving information of terminal 2 and terminal 3 to terminal 2 and terminal 3.

Optionally, Table 5 illustrates another PUCCH resource set configuration table of terminal 2 according to some embodiments of the disclosure.

TABLE 5

| serial number of PUCCH resource | PUCCH resource |
| --- | --- |
| 1 | PUCCH1 |
| 2 | PUCCH2 |
| 3 | PUCCH3 |
| 4 | PUCCH6 |
| 5 | PUCCH7 |

Figure 5:
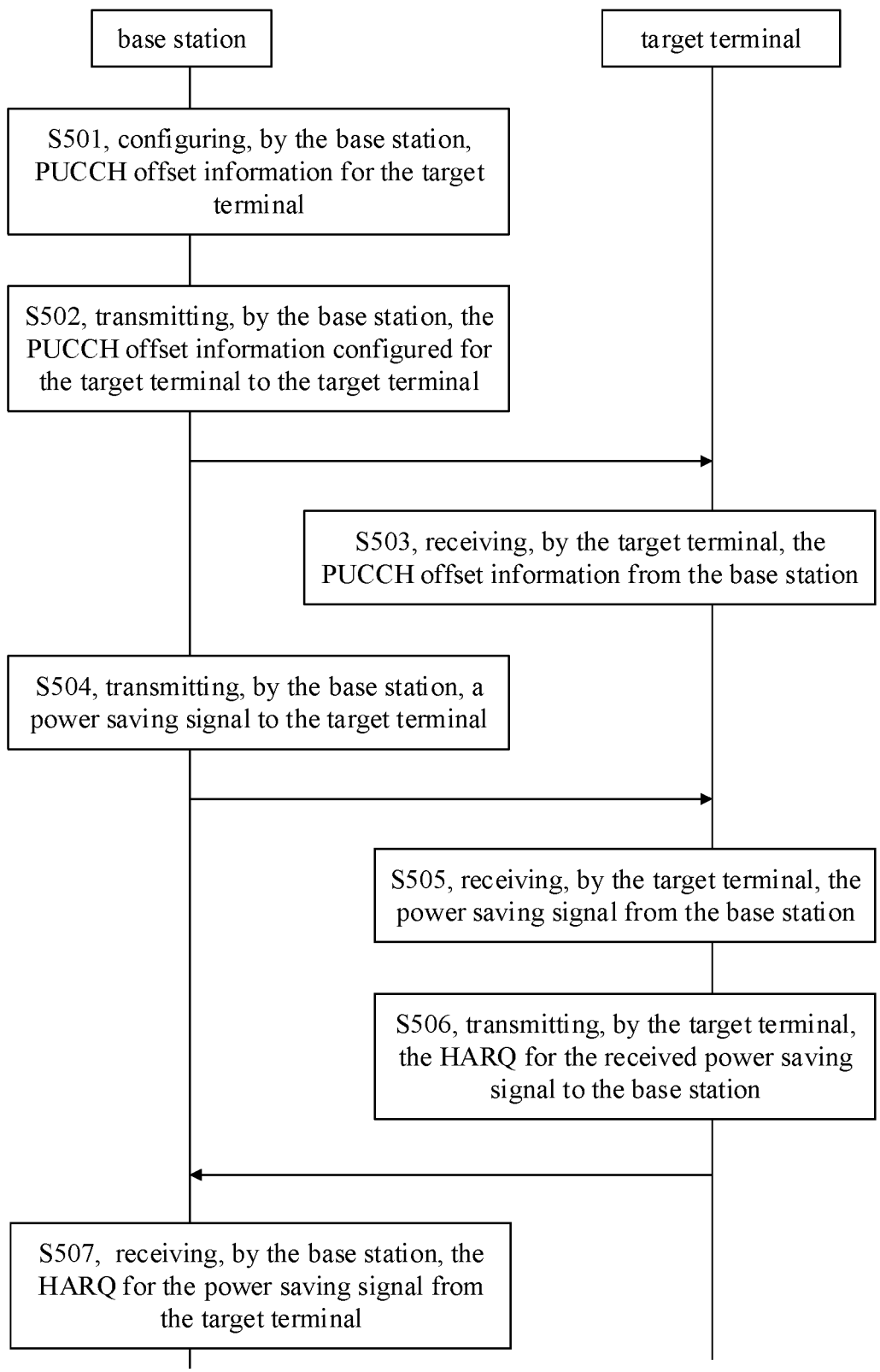
FIG. 5 is a flowchart of a method for feeding back an HARQ, according to embodiments of the disclosure.

As illustrated in FIG. 5, the PUCCH resources of serial numbers 1 to 3 in the PUCCH resource set of terminal 2 are the same with the PUCCH resources of serial numbers 1 to 3 in the PUCCH resource set of terminal 1. However, the PUCCH resources of serial numbers 2 to 5 in the PUCCH resource set of terminal 2 are different from the PUCCH resources of serial numbers 2 to 5 in the PUCCH resource set of terminal 1. At this time, it may be determined that the PUCCH resource sets of terminal 1 and terminal 2 overlap.

In a possible implementation, when the base station determines that the PUCCH resource sets respectively configured for the at least two terminals overlap, the base station may reconfigure the PUCCH resource sets for overlapping terminals respectively, so that the PUCCH resource set of each terminal corresponding to the transmitted power saving signal may not overlap with each other. Or, the base station may randomly select one terminal from the overlapping terminals, remove power saving information of the remaining overlapping terminals from the generated power saving signal of the at least two terminals to form the power saving signal corresponding to the terminals of the PUCCH resource sets not overlapping in the at least two terminals, and transmit the power saving signal to each of the terminals of the PUCCH resource sets not overlapping in the at least two terminals.

In a possible implementation, the action related to power saving may include the following.

1) Selecting and receiving a PDCCH for data scheduling.

For example, when the base station needs to perform data scheduling for the terminal within a subsequent period of time such as service data needs to be transmitted between the base station and the terminal, the base station may transmit the power saving signal to the terminal to instruct the terminal to wake up at the corresponding active time to detect and receive the PDCCH.

2) Skipping detection and reception of a PDCCH for data scheduling.

For example, when the base station does not need to perform data scheduling for the terminal within a subsequent period of time such as service data may not need to be transmitted between the base station and the terminal, the base station may transmit the power saving signal to the terminal to instruct the terminal to continue to sleep at the corresponding active time to save the electric quantity of the terminal.

3) Adjusting a related parameter of communication, in which the related parameter may include at least one of: a bandwidth value used by the terminal, a number of antennas used by the terminal, and a number of candidate positions of the PDCCH.

For example, when the data amount that needs to be transmitted between the base station and the terminal within a subsequent period of time increases, the base station may transmit the power saving signal to the terminal to instruct the terminal to use the higher bandwidth value, the more antenna number and the more PDCCH candidate positions that are to be monitored, thereby adapting to the subsequent service data transmission.

For example, when the data amount that needs to be transmitted between the base station and the terminal within a subsequent period of time decreases, the base station may transmit the power saving signal to the terminal to instruct the terminal to use the lower bandwidth value, the fewer antenna number and the fewer PDCCH candidate positions that are to be monitored, thereby saving the electric quantity of the terminal.

At 402, the target terminal receives the power saving signal transmitted by the base station.

Optionally, each terminal corresponding to the power saving information included in the power saving signal may receive the power saving signal transmitted by the base station. The embodiments of the disclosure are described only by taking one terminal (the target terminal) as an example and other terminals may refer to the target terminal.

Optionally, the target terminal may periodically monitor the power saving signal issued by the base station in the PDCCH. The period in which the target terminal monitors the power saving signal issued by the base station in the PDCCH may be obtained from the DCI issued by the base station. For example, after receiving the DCI issued by the base station, the target terminal may parse the DCI to obtain a transmission period of the power saving signal. When the base station periodically transmits the power saving signal to the at least two terminals, the target terminal may further periodically monitor the power saving signal transmitted by the base station in the PDCCH, thereby receiving the power saving signal transmitted by the base station.

At 403, the target terminal transmits the HARQ for the power saving signal to the base station.

A HARQ resource used by the target terminal for transmitting the HARQ for the power saving signal and a HARQ resource used by a terminal other than the target terminal for transmitting the HARQ for the power saving signal do not overlap; wherein the target terminal and the terminal other than the target terminal are from at least two terminals indicated by the power saving signal. Optionally, the target terminal transmits the HARQ for the received power saving signal to the base station based on the feedback solution of the HARQ for the terminal in the above NR system. However, the HARQ resource used by the target terminal and the HARQ resource used by other terminal in addition to the target terminal in the at least two terminals do not overlap.

For example, the base station may configure one PUCCH resource set for the target terminal through a higher layer signaling, in which each PUCCH resource in the set has one corresponding serial number, for example, {N_PUCCH1, N_PUCCH2, N_PUCCH3, . . . ,}. When the number of PUCCH resources in the PUCCH resource set is less than or equal to 8, the serial number of each PUCCH resource may be directly indicated by a 3-bit information field in the power saving signal. When the number of the PUCCHs in the PUCCH resource set is greater than 8, it may be derived from the serial number of the minimum CCE in CCEs located by the PDCCH and the indication information of the 3-bit information field in the power saving signal. The formula of the derivation process may be as follow:

$$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

where, $R_{PUCCH}$ is a size of the configured PUCCH resource set, $N_{CCE,p}$ is the total number of CCEs occupied by a control field located by the PDCCH, $n_{CCE,p}$ is the serial number of the minimum CCE of the PDCCH, and $\Delta_{PRI}$ is a value indicated by the 3-bit information field in the power saving signal.

The target terminal may transmit the HARQ based on the derived PUCCH resource. Since the PUCCH resources of the at least two terminals do not overlap, the PUCCH resources respectively derived by the at least two terminals based on the same derivation formula are also different. Correspondingly, the HARQ resources used when the HARQs respectively transmitted by the at least two terminals are also different.

At 404, the base station receives the HARQ for the power saving signal from the target terminal.

Optionally, the base station actually may receive HARQs transmitted by the at least two terminals for the power saving signal and obtain the situation of receiving the power saving signal by each of the at least two terminals based on the HARQs respectively transmitted by the at least two terminals.

In summary, the base station transmits the power saving signal to the at least two terminals, in which the power saving signal is configured to instruct the at least two terminals to perform the action related to power saving; and receives the HARQs that are respectively transmitted by the at least two terminals for the power saving signal. The HARQ resources used by the at least two terminals for respectively transmitting the HARQs for the power saving signal do not overlap. In the disclosure, the base station transmits the power saving signal to the at least two terminals and receives the HARQs for the power saving signal, returned by the at least two terminals with different HARQ resources, thereby reducing collisions where the at least two terminals use the same HARQ resource and improving the feedback efficiency of the terminal for the power saving signal.

In a possible implementation, each of the at least two terminals may further receive PUCCH offset information configured by the base station and determine the HARQ resource based on the PUCCH offset information. FIG. 5 is a flowchart illustrating a method for feeding back an HARQ, according to embodiments of the disclosure. The method may be applicable to the wireless communication system as illustrated in FIG. 1 and performed by the base station and the terminal in the system. Optionally, the terminal may be a target terminal. As illustrated in FIG. 5, the method may include the following.

At 501, the base station configures PUCCH offset information for the target terminal.

Optionally, the base station configures the PUCCH offset information for each terminal. Each terminal may include each terminal corresponding to power saving information included in the power saving signal transmitted by the base station. Optionally, the base station configures the PUCCH offset information for each terminal through a higher layer signaling.

In a possible implementation, the base station may configure the PUCCH offset information for each terminal as follows: the PUCCH offset information of terminal 1, terminal 2 and terminal 3 being offset value 1, offset value 2 and offset value 3 respectively.

At 502, the base station transmits the PUCCH offset information configured for the target terminal to the target terminal.

Optionally, the base station actually may transmit the PUCCH offset information configured for each terminal to each terminal. The base station may transmit the PUCCH offset information configured for each terminal to each terminal in a unicast form, so that each terminal may receive the PUCCH offset information for each terminal from the base station. Or, the base station may also transmit the configured PUCCH offset information to each terminal in a multicast form. The PUCCH offset information of terminal 1, terminal 2 and terminal 3 configured by the base station are still taken as offset value 1, offset value 2 and offset value 3 respectively. Optionally, the base station may transmit the configured offset value to terminal 1, terminal 2 and terminal 3 respectively or the base station may transmit the configured offset value to terminal 1, terminal 2 and terminal 3 in a multicast form. In the embodiments of the disclosure, it is not limited how the base station transmits the PUCCH offset information configured for each terminal.

At 503, the target terminal receives the PUCCH offset information from the base station.

When the base station transmits the PUCCH offset information for the target terminal, the target terminal may receive the PUCCH offset information transmitted by the base station. Optionally, the target terminal may be a first terminal corresponding to the power saving signal transmitted by the base station and the first terminal may be any one of terminals corresponding to the power saving signal.

At 504, the base station transmits a power saving signal to the target terminal.

At 505, the target terminal receives the power saving signal from the base station.

504 and 505 may refer to descriptions of 401 and 402 in the embodiments as illustrated in FIG. 4, which are not repeated herein.

At 506, the target terminal transmits the HARQ for the received power saving signal to the base station.

A HARQ resource used by the target terminal for transmitting the HARQ for the power saving signal and a HARQ resource used by a terminal other than the target terminal for transmitting the HARQ for the power saving signal do not overlap; wherein the target terminal and the terminal other than the target terminal are from at least two terminals indicated by the power saving signal. Optionally, the target terminal transmits the HARQ for the received power saving signal to the base station based on the feedback solution of the HARQ for the terminal in the above NR system. However, the HARQ resource used by the target terminal for transmitting the HARQ for the power saving signal is determined based on a first target PUCCH resource of the target terminal. The first target PUCCH resource of the target terminal is determined from a PUCCH resource set of a first terminal based on the PUCCH offset information of the target terminal.

In a possible implementation, the target terminal may calculate the serial number of the PUCCH resource based on a derivation formula in the feedback solution of the HARQ for the terminal in the above NR system first and further calculate the serial number of the first target PUCCH resource based on the received PUCCH offset information transmitted by the base station. Optionally, the calculation manner of the serial number of the first target PUCCH resource may refer to the following formula:

$$N_{PUCCH} = (r_{PUCCH} + P) \bmod R_{PUCCH};$$

where, $N_{PUCCH}$ is the calculated serial number of the first target PUCCH resource and P is the offset value configured by the target station for the target terminal. For example, the PUCCH resource set configured by the base station for the target terminal is as illustrated in Table 4 and the PUCCH offset information configured by the base station for the target terminal is 2. The target terminal may first calculate the serial number $r_{PUCCH}$ of PUCCH resource as 4 according to the derivation formula in the feedback solution of HARQ for the terminal in the NR system. In this case, the target terminal may further calculate $N_{PUCCH}$ as 1 according to the calculation manner of the serial number of the first target PUCCH resource. The target terminal may obtain PUCCH2 resource configured by the base station for the target terminal in the PUCCH resource set based on the serial number of the first target PUCCH resource and use the PUCCH 2 resource as the HARQ resource used when transmitting the HARQ for the power saving signal at this time.

At 507, the base station receives the HARQ for the power saving signal from the target terminal.

Optionally, the base station actually may receive HARQs transmitted by the at least two terminals for the power saving signal and obtain the situation of receiving the power saving signal by each of the at least two terminals based on the HARQs respectively transmitted by the at least two terminals.

Optionally, 502 may be replaced by the base station configuring offset indication information for each terminal. The offset indication information is configured to indicate a corresponding relationship between PUCCH offset information and position information. The position information is configured to indicate a position of the power saving information in the power saving signal.

In a possible implementation, the base station may configure an initial offset value $P_0$ for each terminal. The base station may transmit the offset indication information to each terminal, so that each terminal may calculate its own offset value based on the initial offset value $P_0$. For example, the offset indication information may indicate that each terminal multiplies the initial offset value $P_0$ by L, where L is the position of the power saving information corresponding to each terminal in the power saving signal. As illustrated in Table 1, when the target terminal is terminal 1 in Table 1, if the position of the power saving information of terminal 1 in Table 1 in the power saving signal is 1, the target terminal may obtain its own PUCCH offset information for $P_0*1$, so that at 506, the serial number of the first target PUCCH resource may be calculated by taking $P_0*1$ as its own PUCCH offset information, which is not repeated herein.

In summary, the base station transmits the power saving signal to the at least two terminals, in which the power saving signal is configured to instruct the at least two terminals to perform the action related to power saving; and receives the HARQs that are respectively transmitted by the at least two terminals for the power saving signal. The HARQ resources used by the at least two terminals for respectively transmitting the HARQs for the power saving signal do not overlap. In the disclosure, the base station transmits the power saving signal to the at least two terminals and receives the HARQs for the power saving signal, returned by the at least two terminals with different HARQ resources, thereby reducing collisions where the at least two terminals use the same HARQ resource and improving the feedback efficiency of the terminal for the power saving signal.

Figure 6:
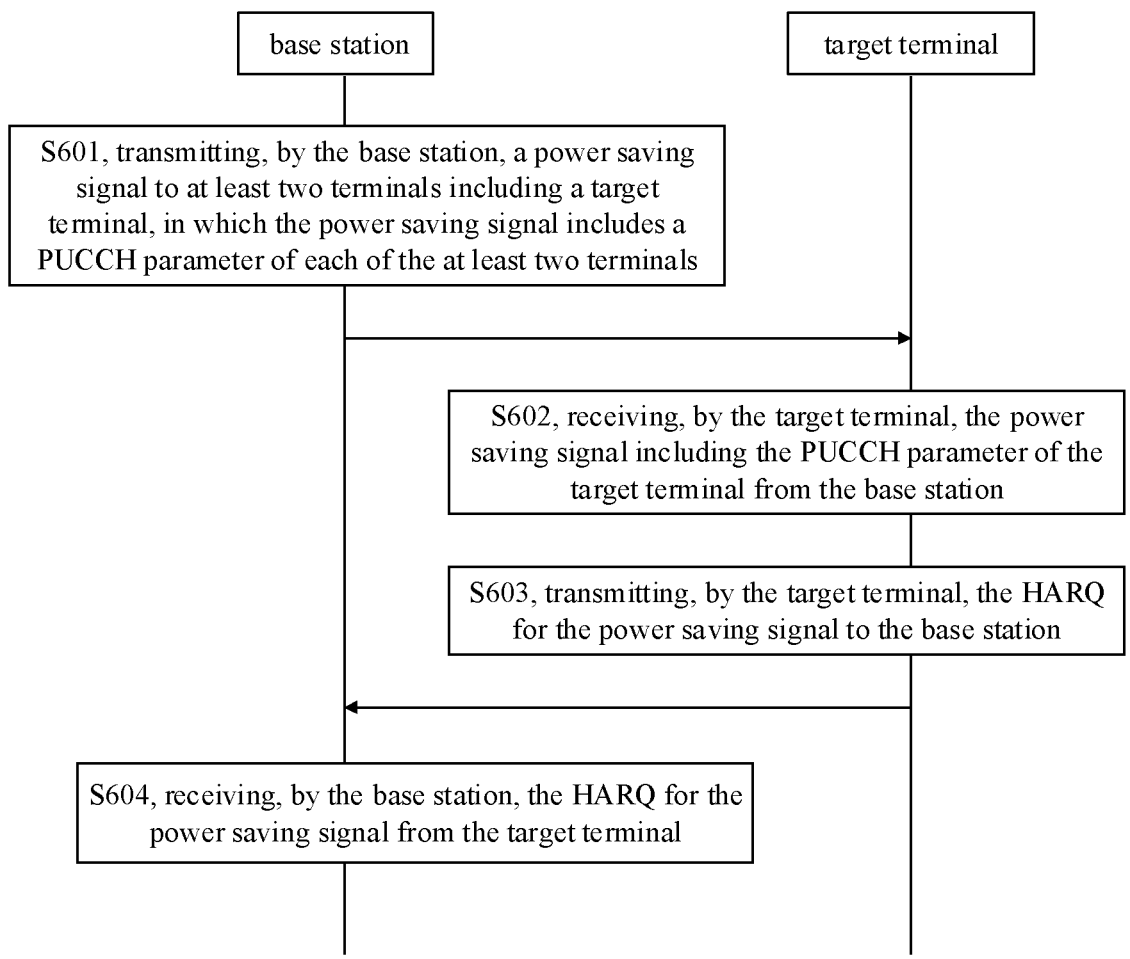
FIG. 6 is a flowchart of a method for feeding back an HARQ, according to embodiments of the disclosure.

In a possible implementation, the power saving signal transmitted by the base station to the at least two terminals may further include a PUCCH parameter of each of the at least two terminals and the at least two terminals may determine HARQ resources based on the corresponding PUCCH parameters. FIG. 6 is a flowchart illustrating a method for feeding back an HARQ, according to embodiments of the disclosure. The method may be applicable to the wireless communication system as illustrated in FIG. 1 and performed by the base station and the terminal in the system. As illustrated in FIG. 6, the method may include the following.

At 601, the base station transmits a power saving signal to at least two terminals including a target terminal, in which the power saving signal includes a PUCCH parameter of each of the at least two terminals.

In a possible implementation, the PUCCH parameter may be a time parameter k. The time parameter k may indicate a time point of transmitting by the terminal the HARQ, for example, the time parameter may be a time offset added on the time of the HARQ resource calculated based on the end time of receiving the power saving signal transmitted by the base station. Optionally, the base station may transmit the time parameter k configured for the target terminal and carried in the power saving signal to the target terminal.

In a possible implementation, the PUCCH parameter may be a PUCCH resource indicator $\Delta_{PRI}$. The PUCCH resource indicator $\Delta_{PRI}$ may indicate the PUCCH resource used when the target terminal transmits the HARQ. For example, the PUCCH resource indicator $\Delta_{PRI}$ may be an indication value of a 3-bit information field in the power saving signal, that is, the base station may configure an indication value of a 3-bit information field in the power saving signal for the target terminal and transmit the PUCCH resource indicator $\Delta_{PRI}$ carried in the power saving signal to the target terminal. Or, the PUCCH parameter may include a time parameter k and a PUCCH resource indicator $\Delta_{PRI}$.

Optionally, the base station transmits the power saving signal including the PUCCH parameter of the target terminal to the target terminal, which may be that the base station may transmit it to the at least two terminals and the at least two terminal includes the target terminal. The base station may transmit the power saving signal including the PUCCH parameter of the target terminal to the at least two terminals including the target terminal in a multicast form. Optionally, the base station may further transmit the power saving signal including the PUCCH parameter of the target terminal to the target terminal periodically and the period of the power saving signal may be notified by the DCI to the target terminal. Similarly, the base station may transmit the power saving signal including the PUCCH parameter of the target terminal to the at least two terminals periodically and the period of the power saving signal may be notified by the DCI to the at least two terminals.

Optionally, the power saving signal may include power saving information corresponding to each of the at least two terminals, which refers to the form of Table 1 as mentioned above. The base station may transmit power saving information corresponding to each of the at least two terminals to the at least two terminals in the form of Table 1, that is, the base station may also transmit power saving information of the target terminal to the target terminal in this way. Each piece of power saving information in Table 1 may be configured to indicate whether there is scheduling data transmitted in the PDCCH for the corresponding terminal.

At 602, the target terminal receives the power saving signal from the base station.

602 may refer to descriptions of 402 in the embodiments as illustrated in FIG. 4, which is not repeated herein.

At 603, the target terminal transmits the HARQ for the power saving signal to the base station.

A HARQ resource used by the target terminal for transmitting the HARQ for the power saving signal and a HARQ resource used by a terminal other than the target terminal for transmitting the HARQ for the power saving signal do not overlap; wherein the target terminal and the terminal other than the target terminal are from at least two terminals indicated by the power saving signal. Optionally, the target terminal transmits the HARQ for the received power saving signal to the base station based on the feedback solution of the HARQ for the terminal in the above NR system. However, the HARQ resource used by the target terminal for transmitting the HARQ for the power saving signal is determined based on the PUCCH parameter of the target terminal.

In a possible implementation, the target terminal may obtain the PUCCH parameter of the target terminal carried in the power saving signal based on the received power saving signal and may calculate the HARQ resource used when transmitting the HARQ to the base station based on its own PUCCH parameter. Optionally, when the PUCCH parameter is a time parameter k, the target terminal may calculate the HARQ time according to an end time of receiving the power saving signal transmitted by the base station based on the feedback solution of the HARQ for the terminal in the above NR system. The target terminal may add the time parameter k to the end time based on the end time of receiving the power saving signal transmitted by the base station, to obtain the HARQ time when transmitting the HARQ to the base station. The target terminal may transmit the HARQ to the base station when the HARQ time arrives.

Optionally, when the PUCCH parameter is a PUCCH resource indicator $\Delta_{PRI}$, the target terminal may bring its own PUCCH resource indicator $\Delta_{PRI}$ in the power saving signal into a derivation formula in the feedback solution of the HARQ for the terminal in the NR system, thereby calculating the serial number of the PUCCH resource. The target terminal may obtain the PUCCH resource in the PUCCH resource set configured by the base station for the target terminal based on the serial number of the PUCCH resource and transmit the HARQ with the PUCCH resource.

Optionally, when the PUCCH parameter includes a time parameter k and a PUCCH resource indicator $\Delta_{PRI}$, the target terminal may calculate the HARQ time and the PUCCH resource used when the target terminal transmits the HARQ to the base station based on the two parameters and transmit the HARQ to the base station with the calculated PUCCH resource when the HARQ time arrives.

Optionally, when the base station configures the PUCCH parameter, one parameter may be configured to be shared by the at least two terminals and another parameter may be configured to different parameter values respectively for the at least two terminals. For example, when the base station configures the PUCCH parameter, the uniform time parameter k may be configured for the at least two terminals. However, the PUCCH resource indicator $\Delta_{PRI}$ configured for each of the at least two terminals may be different. Or, when the base station configures the PUCCH parameter, the uniform PUCCH resource indicator $\Delta_{PRI}$ may be configured for the at least two terminals. However, the time parameters k configured for each of the at least two terminals may be different. Or, the base station may also respectively configure the time parameter k and the PUCCH resource indicator $\Delta_{PRI}$ for each terminal.

At 604, the base station receives the HARQ for the power saving signal from the target terminal.

Optionally, the base station actually may receive HARQs transmitted by the at least two terminals for the power saving signal and obtain the situation of receiving the power saving signal by each of the at least two terminals based on the HARQs respectively transmitted by the at least two terminals.

In summary, the base station transmits the power saving signal to the at least two terminals, in which the power saving signal is configured to instruct the at least two terminals to perform the action related to power saving; and receives the HARQs that are respectively transmitted by the at least two terminals for the power saving signal. The HARQ resources used by the at least two terminals for respectively transmitting the HARQs for the power saving signal do not overlap. In the disclosure, the base station transmits the power saving signal to the at least two terminals and receives the HARQs for the power saving signal, returned by the at least two terminals with different HARQ resources, thereby reducing collisions where the at least two terminals use the same HARQ resource and improving the feedback efficiency of the terminal for the power saving signal.

Figure 7:
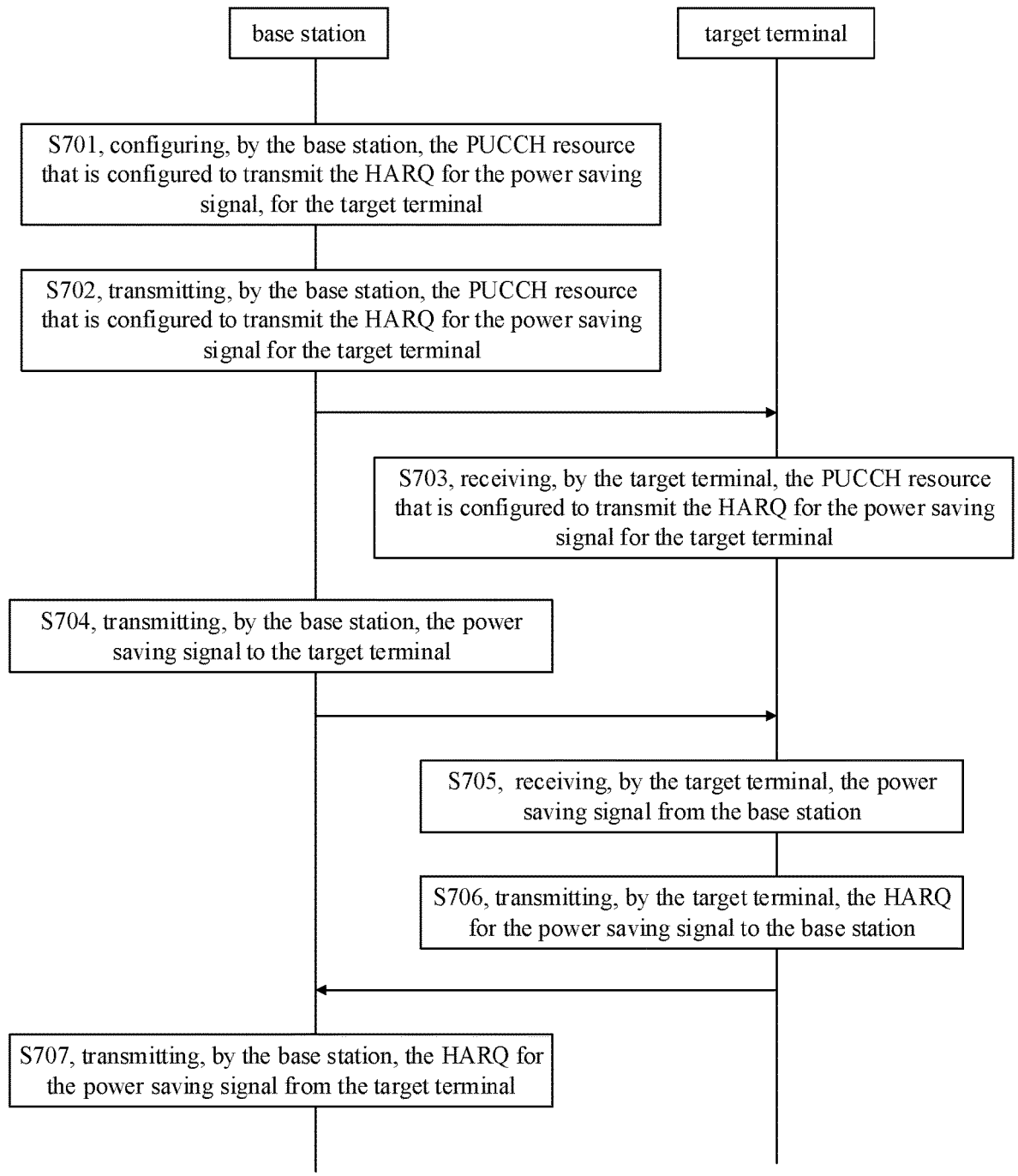
FIG. 7 is a flowchart of a method for feeding back an HARQ, according to embodiments of the disclosure.

In a possible implementation, the target terminal may further receive the PUCCH resource that is configured by the base station and used when transmitting the HARQ for the power saving signal before receiving the power saving signal transmitted by the base station. FIG. 7 is a flowchart illustrating a method for feeding back an HARQ, according to embodiments of the disclosure. The method may be applicable to the wireless communication system as illustrated in FIG. 1 and performed by the base station and the terminal in the system. As illustrated in FIG. 7, the method may include the following.

At 701, the base station configures the PUCCH resource that is configured to transmit the HARQ for the power saving signal, for the target terminal.

Optionally, the base station may respectively configure the PUCCH resource that is configured to transmit the HARQ for the power saving signal, for each terminal. For example, the PUCCH resource configured by the base station for terminal 1 to transmit the HARQ for the power saving signal is PUCCH1 and the PUCCH resource configured by the base station for terminal 2 to transmit the HARQ for the power saving signal is PUCCH2. When terminal 1 receives the power saving signal transmitted by the base station, the HARQ may be transmitted to the base station with PUCCH1. When terminal 2 receives the power saving signal transmitted by the base station, the HARQ may be transmitted to the base station with PUCCH2. Optionally, the base station may configure the PUCCH resource that is configured to transmit the HARQ for the power saving signal for the target terminal by a higher layer signaling.

At 702, the base station transmits the PUCCH resource that is configured to transmit the HARQ for the power saving signal for the target terminal.

Optionally, the base station may transmit respectively the PUCCH resource that is configured to transmit the HARQ for the power saving signal for each terminal to each terminal. The base station may correspond to each terminal in a unicast form and transmit the PUCCH resource that is configured to transmit the HARQ for the power saving signal for each terminal to each terminal. Therefore, each terminal may receive the PUCCH resource that is configured to transmit the HARQ for the power saving signal for each terminal. Or, the base station may transmit the PUCCH resource that is configured to transmit the HARQ for the power saving signal for each terminal to each terminal in a multicast form.

At 703, the target terminal receives the PUCCH resource that is configured to transmit the HARQ for the power saving signal for the target terminal.

When the base station transmits the PUCCH resource that is configured to transmit the HARQ for the power saving signal for the target terminal, the target terminal may receive the PUCCH resource that is configured to transmit the HARQ for the power saving signal for the target terminal.

At 704, the base station transmits the power saving signal to the target terminal.

At 705, the target terminal receives the power saving signal from the base station.

704 and 705 may refer to descriptions of 401 and 402 in the embodiments as illustrated in FIG. 4, which are not repeated herein.

At 706, the target terminal transmits the HARQ for the power saving signal to the base station.

A HARQ resource used by the target terminal for transmitting the HARQ for the power saving signal and a HARQ resource used by a terminal other than the target terminal for transmitting the HARQ for the power saving signal do not overlap; wherein the target terminal and the terminal other than the target terminal are from at least two terminals indicated by the power saving signal. Optionally, when the target terminal transmits the HARQ for the received power saving signal to the base station, the PUCCH resource that is configured by the base station to transmit the HARQ for the power saving signal for itself may be adopted to transmit the HARQ to the base station. Optionally, the HARQ resource that is configured for other terminal may be the PUCCH resource configured by the base station to transmit the HARQ for the power saving signal, thereby ensuring the HARQ resources configured for different terminals do not collide.

At 707, the base station receives the HARQ for the power saving signal from the target terminal.

Optionally, the base station actually may receive HARQs transmitted by the at least two terminals for the power saving signal and obtain the situation of receiving the power saving signal by each of the at least two terminals based on the HARQs respectively transmitted by the at least two terminals.

In summary, the base station transmits the power saving signal to the at least two terminals, in which the power saving signal is configured to instruct the at least two terminals to perform the action related to power saving; and receives the HARQs that are respectively transmitted by the at least two terminals for the power saving signal. The HARQ resources used by the at least two terminals for respectively transmitting the HARQs for the power saving signal do not overlap. In the disclosure, the base station transmits the power saving signal to the at least two terminals and receives the HARQs for the power saving signal, returned by the at least two terminals with different HARQ resources, thereby reducing collisions where the at least two terminals use the same HARQ resource and improving the feedback efficiency of the terminal for the power saving signal.

Figure 8:
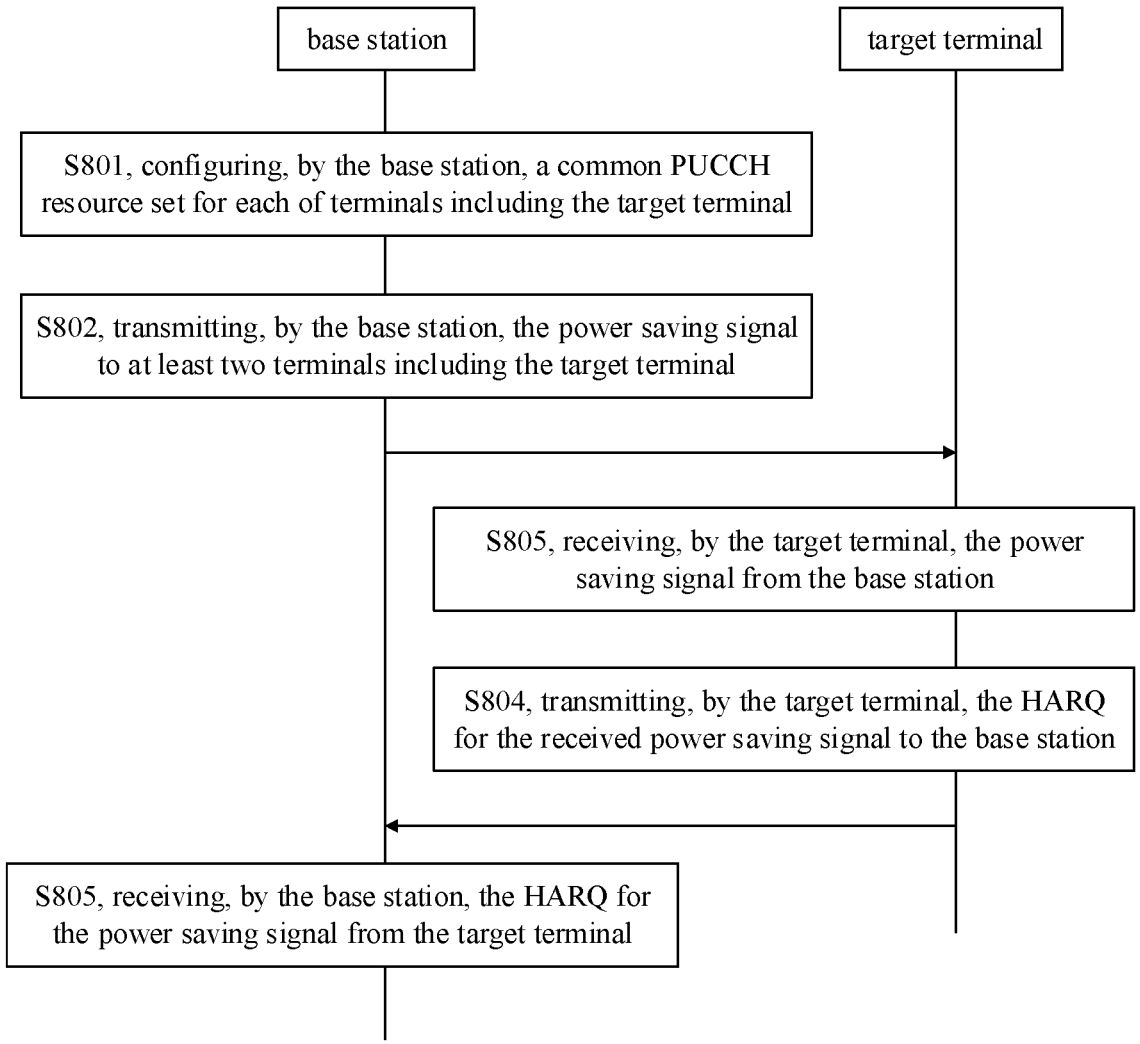
FIG. 8 is a flowchart of a method for feeding back an HARQ, according to embodiments of the disclosure.

In a possible implementation, the target terminal may further receive a common PUCCH resource set configured for each terminal from the base station before receiving the power saving signal from the base station and determine its own available PUCCH resource from the common PUCCH resource set based on the base station's indication. FIG. 8 is a flowchart illustrating a method for feeding back an HARQ, according to embodiments of the disclosure. The method may be applicable to the wireless communication system as illustrated in FIG. 1 and performed by the base station and the terminal in the system. As illustrated in FIG. 8, the method may include the following.

At 801, the base station configures a common PUCCH resource set for each of terminals including the target terminal.

Optionally, the base station may configure the common PUCCH resource set for each terminal through a higher layer signaling.

In a possible implementation, the base station may configure the common PUCCH resource set for each terminal as illustrated in Table 6. Table 6 illustrates a PUCCH resource set configuration table according to some embodiments of the disclosure.

TABLE 6

| PUCCH resource | PUCCH1 | PUCCH2 | PUCCH3 | ... |
| --- | --- | --- | --- | --- |

As illustrated in FIG. 6, PUCCH1, PUCCH2, PUCCH3 may be the common PUCCH resource set configured by the base station for each terminal such as terminal 1, terminal 2 and terminal 3.

At 802, the base station transmits the power saving signal to at least two terminals including the target terminal.

The number of PUCCH resources included in the common PUCCH resource set transmitted by the base station to the target terminal is not less than the number of the at least two terminals.

At 803, the target terminal receives the power saving signal from the base station.

803 may refer to descriptions of 402 in the embodiments as illustrated in FIG. 4, which is not repeated herein.

At 804, the target terminal transmits the HARQ for the received power saving signal to the base station.

A HARQ resource used by the target terminal for transmitting the HARQ for the power saving signal and a HARQ resource used by a terminal other than the target terminal for transmitting the HARQ for the power saving signal do not overlap; wherein the target terminal and the terminal other than the target terminal are from at least two terminals indicated by the power saving signal. Optionally, when the target terminal transmits the HARQ for the received power saving signal to the base station, the HARQ resource used is determined based on a second target PUCCH resource of the target terminal. The second target PUCCH resource of the target terminal is determined from a common PUCCH resource set based on a position of power saving information of the target terminal in the power saving signal. The target terminal may determine the second target PUCCH resource from the common PUCCH resource set based on the position of power saving information of the target terminal in the power saving signal. When the target terminal transmits the HARQ for the received power saving signal to the base station, the second target PUCCH resource is used for transmitting the HARQ.

In a possible implementation, the base station may predefine rules for each terminal to use PUCCH resources in the common PUCCH resource set, for example, when the power saving information corresponding to the target terminal in the power saving signal received by the target terminal is located at a $j^{th}$ position of the power saving signal, the target terminal may transmit the HARQ with the PUCCH resource at the $j^{th}$ position in the common PUCCH resource set. For example, in combination with Table 1 and Table 6, in the above Table 1, the power saving information of terminal 1 is located at the $1^{st}$ position of the power saving signal, and in the above table 6, PUCCH 1 resource is located at the $1^{st}$ position of the common PUCCH resource set. When terminal 1 transmits the HARQ for the power saving signal to the base station, the HARQ resource may be PUCCH 1 resource in the common PUCCH resource set in the Table 6.

At 805, the base station receives the HARQ for the power saving signal from the target terminal.

Optionally, Optionally, the base station actually may receive HARQs transmitted by the at least two terminals for the power saving signal and obtain the situation of receiving the power saving signal by each of the at least two terminals based on the HARQs respectively transmitted by the at least two terminals.

In summary, the base station transmits the power saving signal to the at least two terminals, in which the power saving signal is configured to instruct the at least two terminals to perform the action related to power saving; and receives the HARQs that are respectively transmitted by the at least two terminals for the power saving signal. The HARQ resources used by the at least two terminals for respectively transmitting the HARQs for the power saving signal do not overlap. In the disclosure, the base station transmits the power saving signal to the at least two terminals and receives the HARQs for the power saving signal, returned by the at least two terminals with different HARQ resources, thereby reducing collisions where the at least two terminals use the same HARQ resource and improving the feedback efficiency of the terminal for the power saving signal.

The following apparatus embodiments of the disclosure may be configured to perform the method embodiments of the disclosure. The undisclosed details in the apparatus embodiments of the disclosure may refer to the method embodiments of the disclosure.

Figure 9:
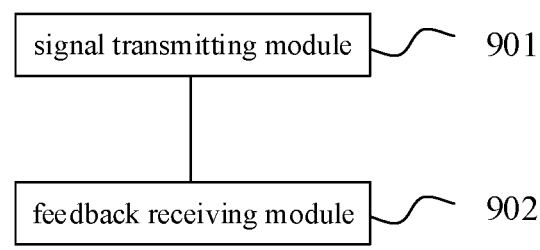
FIG. 9 is a block diagram illustrating an apparatus for feeding back an HARQ, according to embodiments of the disclosure.

FIG. 9 is a block diagram illustrating an apparatus for feeding back an HARQ, according to embodiments of the disclosure. As illustrated in FIG. 9, the apparatus for feeding back the HARQ may be implemented as all or part of the base station in the implementation environment as illustrated in FIG. 1 by hardware or a combination of hardware and software, to perform the actions that are performed by the base station in any one of embodiments of FIG. 2, FIG. 4 to FIG. 8. The apparatus for feeding back the HARQ may include a signal transmitting module 901 and a feedback receiving module 902.

The signal transmitting module 901 is configured to transmit a power saving signal to at least two terminals, in which the power saving signal is configured to instruct the at least two terminals to perform an action related to power saving.

The feedback receiving module 902 is configured to receive HARQs that are respectively transmitted by the at least two terminals for the power saving signal.

HARQ resources used by the at least two terminals for respectively transmitting the HARQs for the power saving signal do not overlap.

Optionally, the signal transmitting module 901 is configured to: transmit the power saving signal to the at least two terminals in response to that PUCCH resource sets of the at least two terminals do not overlap.

The PUCCH resource set is a set of available PUCCH resources configured by a higher layer signaling to the corresponding terminal.

Optionally, the apparatus further includes: an offset information configuring module.

The offset information configuring module is configured to, before the signal transmitting module transmits the power saving signal to the at least two terminals, configure PUCCH offset information for each of terminals, in which the terminals include the at least two terminals.

Optionally, the signal transmitting module 901 is configured to: transmit the power saving signal including a PUCCH parameter of each of the at least two terminals to the at least two terminals; the PUCCH parameter includes at least one of: a time parameter k and a PUCCH resource indicator $\Delta_{PRI}$; the time parameter k is configured to indicate a time point of transmitting the HARQ and the PUCCH resource indicator $\Delta_{PRI}$ is configured to indicate a PUCCH resource configured for transmitting the HARQ.

Optionally, the apparatus further includes: a resource configuring module.

The resource configuring module is configured to, before the signal transmitting module transmits the power saving signal to the at least two terminals, configure, a PUCCH resource that is configured to transmit the HARQ for the power saving signal, for each of terminals, in which the terminals include the at least two terminals.

Optionally, the apparatus further includes: a resource set configuring module.

The resource set configuring module is configured to, before the signal transmitting module transmits the power saving signal to the at least two terminals, configure a common PUCCH resource set for each of terminals, in which the terminals include the at least two terminals and a number of PUCCH resources in the common PUCCH resource set is not less than a number of the at least two terminals.

Optionally, the action related to power saving includes the following.

Detecting and receiving a PDCCH for data scheduling.

Or, skipping detection and reception of a PDCCH for data scheduling.

Or, adjusting a related parameter of communication, in which the related parameter includes at least one of: a bandwidth value used by the terminal, a number of antennas used by the terminal, and a number of candidate positions of the PDCCH.

Figure 10:
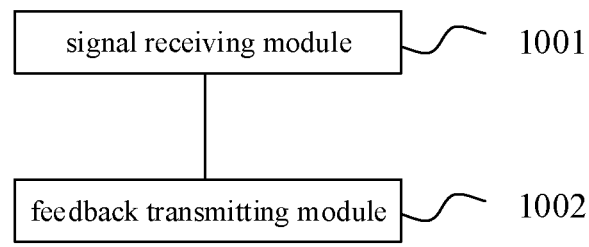
FIG. 10 is a block diagram illustrating an apparatus for feeding back an HARQ, according to embodiments of the disclosure.

FIG. 10 is a block diagram illustrating an apparatus for feeding back an HARQ, according to embodiments of the disclosure. As illustrated in FIG. 10, the apparatus for feeding back the HARQ may be implemented as all or part of the terminal in the implementation environment as illustrated in FIG. 1 by hardware or a combination of hardware and software, to perform the actions that are performed by the target terminal in any one of embodiments of FIG. 3, FIG. 4 to FIG. 8. The apparatus for feeding back the HARQ may include a signal receiving module 1001 and a feedback transmitting module 1002.

The signal receiving module 1001 is configured to receive a power saving signal.

The power saving signal is configured to instruct the target terminal to perform an action related to power saving.

The feedback transmitting module 1002 is configured to transmit the HARQ for the power saving signal to a base station.

A HARQ resource used by the target terminal for transmitting the HARQ for the power saving signal and a HARQ resource used by a terminal other than the target terminal for transmitting the HARQ for the power saving signal do not overlap; wherein the target terminal and the terminal other than the target terminal are from at least two terminals indicated by the power saving signal.

Optionally, the signal receiving module 1001 is configured to: receive the power saving signal transmitted by the base station in response to that PUCCH resource sets of the at least two terminals do not overlap.

The PUCCH resource set is a set of available PUCCH resources configured by a higher layer signaling to the corresponding terminal.

Optionally, the HARQ resource used by the target terminal for transmitting the HARQ for the power saving signal is determined based on a first target PUCCH resource of the target terminal.

The first target PUCCH resource of the target terminal is determined from a PUCCH resource set of the target terminal based on PUCCH offset information of the target terminal.

Optionally, the apparatus further includes: an offset information receiving module.

The offset information receiving module is configured to, before the signal receiving module receives the power saving signal, receive the PUCCH offset information configured by the base station for the target terminal.

Optionally, the HARQ resource used by the target terminal for transmitting the HARQ for the power saving signal is determined based on a PUCCH parameter of the target terminal.

The PUCCH parameter includes at least one of: a time parameter k and a PUCCH resource indicator $\Delta_{PRI}$; the time parameter k is configured to indicate a time point of transmitting the HARQ and the PUCCH resource indicator $\Delta_{PRI}$ is configured to indicate a PUCCH resource configured for transmitting the HARQ.

Optionally, the signal receiving module 1001 is configured to: receive the power saving signal including the PUCCH parameter of each of the at least two terminals.

Optionally, the apparatus further includes: a resource receiving module.

The resource receiving module is configured to, before the signal receiving module receives the power saving signal, receive a PUCCH resource that is configured by the base station for the target terminal to transmit the HARQ for the power saving signal.

Optionally, the HARQ resource used by the target terminal for transmitting the HARQ for the power saving signal is determined based on a second target PUCCH resource of the target terminal.

The second target PUCCH resource of the target terminal is determined from a common PUCCH resource set based on a position of power saving information of the target terminal in the power saving signal; a number of PUCCH resources in the common PUCCH resource set is not less than a number of the at least two terminals; and the power saving information is saving information of each of the at least two terminals in the power saving signal.

Optionally, the apparatus further includes: a resource set receiving module.

The resource set receiving module is configured to, before the signal receiving module receives the power saving signal, receive the common PUCCH resource set configured by the base station.

Optionally, the action related to power saving includes the following.

Detecting and receiving a PDCCH for data scheduling.

Or, skipping detection and reception of a PDCCH for data scheduling.

Or, adjusting a related parameter of communication, in which the related parameter includes at least one of: a bandwidth value used by the terminal, a number of antennas used by the terminal, and a number of candidate positions of the PDCCH.

It should be noted that, when the apparatuses provided in the above embodiments implement their functions, the division of the above function modules is illustrated only for an example. In practical applications, the above functions may be allocated to be completed by different function modules according to actual requirements, that is, the content structure of the apparatuses is divided into different function modules to complete all or part of functions described above.

With respect to the apparatuses in the above embodiments, the specific manners for performing operations for individual modules therein have been described in detail in the embodiments regarding the methods, which will not be elaborated herein.

Some embodiments in the disclosure provide a device for feeding back an HARQ, which may implement all or part of actions performed by the base station in embodiments as illustrated in FIG. 2, FIG. 4 to FIG. 8. The device for feeding back the HARQ includes a processor and a memory configured to store instructions executable by the processor.

The processor is configured to transmit a power saving signal to at least two terminals, in which the power saving signal is configured to instruct the at least two terminals to perform an action related to power saving; and receive HARQs that are respectively transmitted by the at least two terminals for the power saving signal.

HARQ resources used by the at least two terminals for respectively transmitting the HARQs for the power saving signal do not overlap.

Optionally, when transmitting the power saving signal to the at least two terminals, the processor is configured to: transmit the power saving signal to the at least two terminals in response to that PUCCH resource sets of the at least two terminals do not overlap.

The PUCCH resource set is a set of available PUCCH resources configured by a higher layer signaling to the corresponding terminal.

Optionally, the processor is further configured to, before the signal transmitting module transmits the power saving signal to the at least two terminals, configure PUCCH offset information for each of terminals, in which the terminals include the at least two terminals.

Optionally, when transmitting power saving signal to the at least two terminals, the processor is configured to: transmit the power saving signal including a PUCCH parameter of each of the at least two terminals to the at least two terminals; the PUCCH parameter includes at least one of: a time parameter k and a PUCCH resource indicator $\Delta_{PRI}$; the time parameter k is configured to indicate a time point of transmitting the HARQ and the PUCCH resource indicator $\Delta_{PRI}$ is configured to indicate a PUCCH resource configured for transmitting the HARQ.

Optionally, the processor is further configured to, before the signal transmitting module transmits the power saving signal to the at least two terminals, configure, a PUCCH resource that is configured to transmit the HARQ for the power saving signal, for each of terminals, in which the terminals include the at least two terminals.

Optionally, the processor is further configured to, before the signal transmitting module transmits the power saving signal to the at least two terminals, configure a common PUCCH resource set for each of terminals, in which the terminals include the at least two terminals and a number of PUCCH resources in the common PUCCH resource set is not less than a number of the at least two terminals.

Optionally, the processor is further configured as follows.

The action related to power saving includes the following.

Detecting and receiving a PDCCH for data scheduling.

Or, skipping detection and reception of a PDCCH for data scheduling.

Or, adjusting a related parameter of communication, in which the related parameter includes at least one of: a bandwidth value used by the terminal, a number of antennas used by the terminal, and a number of candidate positions of the PDCCH.

Some embodiments in the disclosure provide a device for feeding back an HARQ, which may implement all or part of actions performed by the target terminal in embodiments as illustrated in FIG. 3, FIG. 4 to FIG. 8. The apparatus for feeding back the HARQ includes a processor and a memory configured to store instructions executable by the processor.

The processor is configured to: receive a power saving signal, in which the power saving signal is configured to instruct the target terminal to perform an action related to power saving; and transmit the HARQ for the power saving signal to a base station.

A HARQ resource used by the target terminal for transmitting the HARQ for the power saving signal and a HARQ resource used by a terminal other than the target terminal for transmitting the HARQ for the power saving signal do not overlap; wherein the target terminal and the terminal other than the target terminal are from at least two terminals indicated by the power saving signal.

Optionally, when receiving the power saving signal, the processor is configured to: receive the power saving signal transmitted by the base station in response to that PUCCH resource sets of the at least two terminals do not overlap.

The PUCCH resource set is a set of available PUCCH resources configured by a higher layer signaling to the corresponding terminal.

Optionally, the HARQ resource used by the target terminal for transmitting the HARQ for the power saving signal is determined based on a first target PUCCH resource of the target terminal.

The first target PUCCH resource of the target terminal is determined from a PUCCH resource set of the target terminal based on PUCCH offset information of the target terminal.

Optionally, the processor is further configured to, before the signal receiving module receives the power saving signal, receive the PUCCH offset information configured by the base station for the target terminal.

Optionally, the HARQ resource used by the target terminal for transmitting the HARQ for the power saving signal is determined based on a PUCCH parameter of the target terminal.

The PUCCH parameter includes at least one of: a time parameter k and a PUCCH resource indicator $\Delta_{PRI}$; the time parameter k is configured to indicate a time point of transmitting the HARQ and the PUCCH resource indicator $\Delta_{PRI}$ is configured to indicate a PUCCH resource configured for transmitting the HARQ.

Optionally, receiving the power saving signal, the processor is configured to: receive the power saving signal including the PUCCH parameter of each of the at least two terminals.

Optionally, before receiving the power saving signal, the processor is further configured to: receive a PUCCH resource that is configured by the base station for the target terminal to transmit the HARQ for the power saving signal.

Optionally, the HARQ resource used by the target terminal for transmitting the HARQ for the power saving signal is determined based on a second target PUCCH resource of the target terminal.

The second target PUCCH resource of the target terminal is determined from a common PUCCH resource set based on a position of power saving information of the target terminal in the power saving signal; a number of PUCCH resources in the common PUCCH resource set is not less than a number of the at least two terminals; and the power saving information is saving information of each of the at least two terminals in the power saving signal.

Optionally, the processor is further configured to, before the signal receiving module receives the power saving signal, receive the common PUCCH resource set configured by the base station.

Optionally, the action related to power saving, the processor is configured to perform the following.

Detecting and receiving a PDCCH for data scheduling.

Or, skipping detection and reception of a PDCCH for data scheduling.

Or, adjusting a related parameter of communication, in which the related parameter includes at least one of: a bandwidth value used by the terminal, a number of antennas used by the terminal, and a number of candidate positions of the PDCCH.

The solutions in embodiments of the disclosure may be introduced by taking the base station and the target terminal as an example. It may be understood that, the base station and the target terminal each includes hardware structures and/or software modules to perform each function in order to achieve the functions. The modules and algorithm actions of the examples described in connection with the embodiments disclosed herein may be implemented by hardware or a combination of hardware and computer software. Whether a certain function is performed by hardware or software depends on particular applications and design constraints of the technical solutions. Those skilled in the art may implement the described functions for each particular application with different methods. However, the implementation should not be considered beyond the scope of the technical solutions in embodiments of the disclosure.

Figure 11:
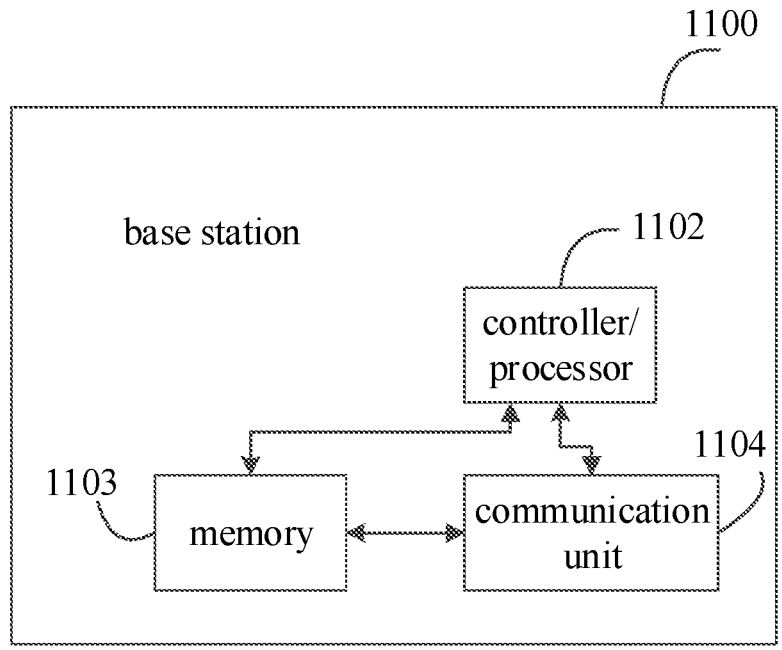
FIG. 11 is a block diagram illustrating a structure of a base station, according to embodiments of the disclosure.

FIG. 11 is a block diagram illustrating a structure of a base station, according to embodiments of the disclosure.

A base station 1100 includes a communication unit 1104 and a processor 1102. The processor 1102 may also be a controller and represented as "controller/processor 1102" in FIG. 11. The communication unit 1104 is configured to support communication between the base station and other network devices (for example, a terminal, another base station, a gateway, etc.).

Further, the base station 1100 may further include a memory 1103 configured to store program codes and data of the base station 1100.

It may be understood that, FIG. 11 only illustrates a simplified design of the base station 1100. In practical applications, the base station 1100 may include any number of processors, controllers, memories, communication units, etc. All base stations that may implement embodiments of the disclosure are within the scope of embodiments of the disclosure.

Figure 12:
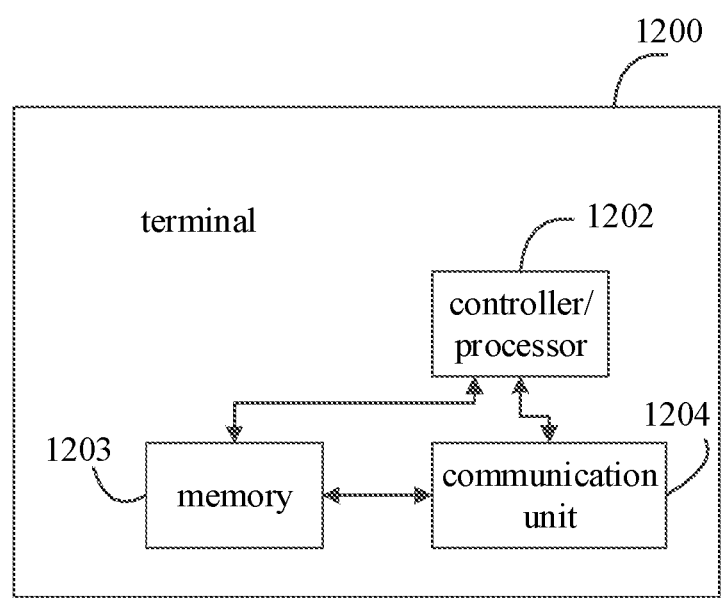
FIG. 12 is a block diagram illustrating a structure of a terminal, according to embodiments of the disclosure.

FIG. 12 is a block diagram illustrating a structure of a terminal, according to embodiments of the disclosure.

A terminal 1200 includes a communication unit 1204 and a processor 1202. The processor 1202 may also be a controller and represented as "controller/processor 1202" in FIG. 12. The communication unit 1204 is configured to support communication between the terminal and other network devices (for example, a terminal, another base station, a gateway, etc.).

Further, the terminal 1200 may further include a memory 1203 configured to store program codes and data of the terminal 1200.

It may be understood that, FIG. 12 only illustrates a simplified design of the terminal 1200. In practical applications, the terminal 1200 may include any number of processors, controllers, memories, communication units, etc. All terminals that may implement embodiments of the disclosure are within the scope of embodiments of the disclosure.

Those skilled in the art should realize that, in one or more examples, the functions described in the embodiments of the disclosure may be implemented by hardware, software, firmware or any combination thereof. When implemented by software, the functions may be stored in a computer-readable medium or transmitted as one or more instructions or codes on a computer-readable medium. A computer-readable medium includes a computer storage medium and a communication medium. The communication medium includes any medium that facilitates transmitting a computer program from one place to another. The storage medium may be any available medium accessible by a general-purpose or special-purpose computer.

The embodiments of the disclosure further provide a computer storage medium configured to store computer software instructions used by the base station, the computer software instructions including a program designed for performing the method for feeding back the HARQ as mentioned above.

The embodiments of the disclosure further provide a computer storage medium configured to store computer software instructions used by the terminal, the computer software instructions including a program designed for performing the method for feeding back the HARQ as mentioned above.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for feeding back a hybrid automatic repeat request (HARQ), being performed by a base station, comprising:
configuring a common physical uplink control channel (PUCCH) resource set for each of terminals, wherein the terminals comprise at least two terminals and a number of PUCCH resources in the common PUCCH resource set is not less than a number of the at least two terminals;
transmitting a power saving signal to the at least two terminals, the power saving signal being configured to instruct the at least two terminals to perform an action related to power saving; and
receiving HARQs that are respectively transmitted by the at least two terminals for the power saving signal;
wherein HARQ resources used by the at least two terminals for respectively transmitting the HARQs for the power saving signal do not overlap.

2. The method as claimed in claim 1, wherein, transmitting the power saving signal to the at least two terminals comprises:
transmitting the power saving signal to the at least two terminals in response to that PUCCH resource sets of the at least two terminals do not overlap,
wherein, the PUCCH resource set is a set of available PUCCH resources configured by a higher layer signaling to the corresponding terminal.

3. The method as claimed in claim 1, before transmitting the power saving signal to the at least two terminals, further comprising:
configuring PUCCH offset information for each of terminals, wherein the terminals comprise the at least two terminals.

4. The method as claimed in claim 1, wherein, transmitting the power saving signal to the at least two terminals, comprises:
transmitting the power saving signal comprising a PUCCH parameter of each of the at least two terminals to the at least two terminals; the PUCCH parameter comprises at least one of: a time parameter k and a PUCCH resource indicator $\Delta_{PRI}$; the time parameter k is configured to indicate a time point of transmitting the HARQ and the PUCCH resource indicator $\Delta_{PRI}$ is configured to indicate a PUCCH resource configured for transmitting the HARQ.

5. The method as claimed in claim 1, before transmitting the power saving signal to the at least two terminals, further comprising:
configuring a PUCCH resource for transmitting the HARQ for the power saving signal, for each of the terminals, wherein the terminals comprise the at least two terminals.

6. The method as claimed in claim 1, wherein the action related to power saving comprises:
detecting and receiving a physical downlink control channel (PDCCH) for data scheduling; or,
skipping detection and reception of a PDCCH for data scheduling; or,
adjusting a related parameter of communication, wherein the related parameter comprises at least one of: a bandwidth value used by the terminal, a number of antennas used by the terminal, and a number of candidate positions of the PDCCH.

7. A non-transitory computer-readable storage medium comprising executable instructions that are called by a processor in a base station to perform the method as claimed in claim 1.

8. A method for feeding back a hybrid automatic repeat request (HARQ), being performed by a target terminal, comprising:
receiving a common physical uplink control channel (PUCCH) resource set configured by a base station, wherein a number of PUCCH resources in the common PUCCH resource set is not less than a number of at least two terminals, and each of the at least two terminals determines available PUCCH resources according to an indication of the base station;
receiving a power saving signal, the power saving signal being configured to instruct the target terminal to perform an action related to power saving; and
transmitting the HARQ for the power saving signal to a base station;
wherein a HARQ resource used by the target terminal for transmitting the HARQ for the power saving signal and a HARQ resource used by a terminal other than the target terminal for transmitting the HARQ for the power saving signal do not overlap; wherein the target terminal and the terminal other than the target terminal are from the at least two terminals indicated by the power saving signal.

9. The method as claimed in claim 8, wherein receiving the power saving signal comprises:
receiving the power saving signal transmitted by the base station in response to that PUCCH resource sets of the at least two terminals do not overlap;
wherein, the PUCCH resource set is a set of available PUCCH resources configured by a higher layer signaling to the corresponding terminal.

10. The method as claimed in claim 8, wherein,
the HARQ resource used by the target terminal for transmitting the HARQ for the power saving signal is determined based on a first target PUCCH resource of the target terminal; and
the first target PUCCH resource of the target terminal is determined from a PUCCH resource set of the target terminal based on PUCCH offset information of the target terminal.

11. The method as claimed in claim 10, before receiving the power saving signal, further comprising:
receiving the PUCCH offset information configured by the base station for the target terminal.

12. The method as claimed in claim 8, wherein, the HARQ resource used by the target terminal for transmitting the HARQ for the power saving signal is determined based on a PUCCH parameter of the target terminal; and the PUCCH parameter comprises at least one of: a time parameter k and a PUCCH resource indicator $\Delta_{PRI}$; the time parameter k is configured to indicate a time point of transmitting the HARQ and the PUCCH resource indicator $\Delta_{PRI}$ is configured to indicate a PUCCH resource configured for transmitting the HARQ.

13. The method as claimed in claim 12, wherein receiving the power saving signal comprises:

receiving the power saving signal comprising the PUCCH parameter of each of the at least two terminals.

14. The method as claimed in claim 8, before receiving the power saving signal, further comprising:

receiving a PUCCH resource that is configured by the base station for the target terminal to transmit the HARQ for the power saving signal.

15. The method as claimed in claim 8, wherein, the HARQ resource used by the target terminal for transmitting the HARQ for the power saving signal is determined based on a second target PUCCH resource of the target terminal; and the second target PUCCH resource of the target terminal is determined from a common PUCCH resource set based on a position of power saving information of the target terminal in the power saving signal; a number of PUCCH resources in the common PUCCH resource set is not less than a number of the at least two terminals; and the power saving information is saving information of each of the at least two terminals in the power saving signal.

16. The method as claimed in claim 8, wherein the action related to power saving comprises:

detecting and receiving a physical downlink control channel (PDCCH) for data scheduling; or, skipping detection and reception of a PDCCH for data scheduling; or, adjusting a related parameter of communication, wherein the related parameter comprises at least one of: a bandwidth value used by the terminal, a number of antennas used by the terminal, and a number of candidate positions of the PDCCH.

17. A device for feeding back a hybrid automatic repeat request (HARQ), for a target station, comprising:

a processor; and a memory configured to store instructions executable by the processor;

wherein, the processor is configured to perform the method as claimed in claim 8.

18. A device for feeding back a hybrid automatic repeat request (HARQ), for a base station, comprising:

a processor; and a memory configured to store instructions executable by the processor;

wherein, the processor is configured to:

configure a common physical uplink control channel (PUCCH) resource set for each of terminals, wherein the terminals comprise at least two terminals and a number of PUCCH resources in the common PUCCH resource set is not less than a number of the at least two terminals;

transmit a power saving signal to the at least two terminals, the power saving signal being configured to instruct the at least two terminals to perform an action related to power saving; and receive HARQs that are respectively transmitted by the at least two terminals for the power saving signal;

wherein HARQ resources used by the at least two terminals for respectively transmitting the HARQs for the power saving signal do not overlap.

\* \* \* \* \*